United States Patent
Higgins et al.

(10) Patent No.: US 10,339,044 B2
(45) Date of Patent: Jul. 2, 2019

(54) METHOD AND SYSTEM FOR BLENDING DATA RECLAMATION AND DATA INTEGRITY GARBAGE COLLECTION

(71) Applicant: SanDisk Technologies LLC, Plano, TX (US)

(72) Inventors: James M. Higgins, Chandler, AZ (US); Ryan R. Jones, Mesa, AZ (US)

(73) Assignee: SanDisk Technologies LLC, Plano, TX (US)

( * ) Notice: Subject to any disclaimer, the term of this patent is extended or adjusted under 35 U.S.C. 154(b) by 61 days.

(21) Appl. No.: 15/422,418

(22) Filed: Feb. 1, 2017

(65) Prior Publication Data

US 2017/0286288 A1 Oct. 5, 2017

Related U.S. Application Data

(60) Provisional application No. 62/315,526, filed on Mar. 30, 2016.

(51) Int. Cl.
  *G06F 3/06* (2006.01)
  *G06F 12/02* (2006.01)
  *G06F 11/10* (2006.01)

(52) U.S. Cl.
  CPC .......... *G06F 12/0246* (2013.01); *G06F 3/061* (2013.01); *G06F 3/0616* (2013.01); *G06F 3/0652* (2013.01); *G06F 3/0688* (2013.01); *G06F 11/1048* (2013.01); *G06F 2212/1036* (2013.01); *G06F 2212/2022* (2013.01);

(Continued)

(58) Field of Classification Search
  CPC .... G06F 3/0608; G06F 3/0616; G06F 3/0619; G06F 3/0649; G06F 3/0652; G06F 3/0688; G06F 11/1004; G06F 12/0246; G06F 2212/1036; G06F 2212/2022; G06F 2212/7205; G06F 2212/7211
  See application file for complete search history.

(56) References Cited

U.S. PATENT DOCUMENTS

2009/0193174 A1* 7/2009 Reid ................... G06F 12/0246
                                                         711/100
2011/0055455 A1* 3/2011 Post ................... G06F 12/0246
                                                         711/103

(Continued)

*Primary Examiner* — Larry T Mackall
(74) *Attorney, Agent, or Firm* — Dickinson Wright PLLC

(57) ABSTRACT

The various implementations described herein include systems, methods and/or devices used for garbage collection in memory system. The method includes: (1) determining occurrences of triggering events including data reclamation events, urgent data integrity recycling events, and scheduled data integrity recycling events, and (2) recycling, in response to each of a plurality of triggering events, data in a predefined quantity of memory units from a source memory portion to a target memory portion of the memory system. A respective data reclamation event corresponds to the occurrence of host data write operations in accordance with a target reclamation to host write ratio. A respective urgent data integrity recycling event occurs when a memory portion satisfies predefined urgent read disturb criteria. A respective scheduled data integrity recycling event occurs at a rate corresponding to a projected quantity of memory units to be recycled by the memory system over a period of time.

20 Claims, 9 Drawing Sheets

(52) U.S. Cl.
CPC ............... *G06F 2212/7205* (2013.01); *G06F 2212/7211* (2013.01)

(56) References Cited

U.S. PATENT DOCUMENTS

| | | | |
|---|---|---|---|
| 2011/0107050 A1* | 5/2011 | Vengerov | G06F 12/0269 711/170 |
| 2011/0191528 A1* | 8/2011 | Suzuki | G06F 12/02 711/103 |
| 2014/0032817 A1* | 1/2014 | Bux | G06F 12/0246 711/103 |
| 2014/0181370 A1* | 6/2014 | Cohen | G06F 12/0246 711/103 |

* cited by examiner

400

402 — Determining occurrences of triggering events, wherein the triggering events include: data reclamation events, urgent data integrity recycling events, and scheduled data integrity recycling events, wherein the data reclamation events include events that each corresponds to the occurrence of one or more host data write operations in accordance with a target reclamation to host write ratio, a respective urgent data integrity recycling event occurs when a respective memory portion of the non-volatile memory system satisfies predefined urgent read disturb criteria, and the scheduled data integrity recycling events include events that occur at a rate corresponding to a projected quantity of memory units for which data integrity recycling is to be performed by the non-volatile memory system over a period of time

404 — Each of the urgent data integrity recycling events and the scheduled data integrity recycling events occurs when a trigger timeout period expires, and wherein the trigger timeout period is set to distinct values in response to different predefined data integrity recycling conditions of the non-volatile memory system

406 — Resetting a timer to restart the trigger timeout period, in response to recycling data from a respective source memory portion to a respective target memory portion of the non-volatile memory system

408 — The trigger timeout period is set to a predefined minimum timeout value in response to detecting that a memory portion satisfies the predefined urgent read disturb criteria (B)   (C)

METHOD AND SYSTEM FOR BLENDING DATA RECLAMATION AND DATA INTEGRITY GARBAGE COLLECTION

RELATED APPLICATIONS

This application claims priority to U.S. Provisional Patent Application No. 62/315,526, filed Mar. 30, 2016, which is hereby incorporated by reference in its entirety.

TECHNICAL FIELD

The disclosed embodiments relate generally to memory systems, and in particular, to blending data reclamation garbage collection and data integrity garbage collection in a non-volatile memory system (e.g., comprising one or more flash memory devices).

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information.

Garbage collection operations are performed for reclaiming space for host writes and for ensuring data read reliability. As non-volatile memory size in enterprise systems continues to grow, and such system are used by an increasing number and variety of hosts having different memory usage patterns, garbage collection to ensure data integrity, as well as for data reclamation, consumes more resources of the memory devices and potentially has a greater impact on the availability of non-volatile memory to the hosts. Therefore, it would be desirable to effectively and efficiently manage garbage collection operations for data integrity and data reclamation for one or more portions of the memory to evenly spread the garbage collection work and to provide reduced impact to host activities.

SUMMARY

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Detailed Description," one will understand how the aspects of various embodiments are used to enable adaptive verify voltage adjustment in memory devices.

The disclosed device and method improve the performance and reliability of non-volatile memory, such as flash memory, by blending data reclamation and data integrity garbage collection. Occurrences of triggering events are determined. The triggering events include data reclamation events, urgent data integrity recycling events, and scheduled data integrity recycling events. The data reclamation events include events that correspond to the occurrence of host data write operations in accordance with a target reclamation to host write ratio. A respective urgent data integrity recycling event occurs when a respective memory portion of the non-volatile memory system satisfies predefined urgent read disturb criteria. The scheduled data integrity recycling events include events that occur at a rate corresponding to a projected quantity of memory units for which data integrity recycling is to be performed by the non-volatile memory system over a period of time. In some embodiments, data in a predefined quantity of memory units is recycled from a source memory portion to a target memory portion of the non-volatile memory system in response to each of a plurality of triggering events.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate the more pertinent features of the present disclosure and are therefore not to be considered limiting, for the description may admit to other effective features.

FIGS. 4A-4E illustrate a flowchart representation of a method of performing garbage collection in a non-volatile memory system, in accordance with some embodiments.

Figure 1:
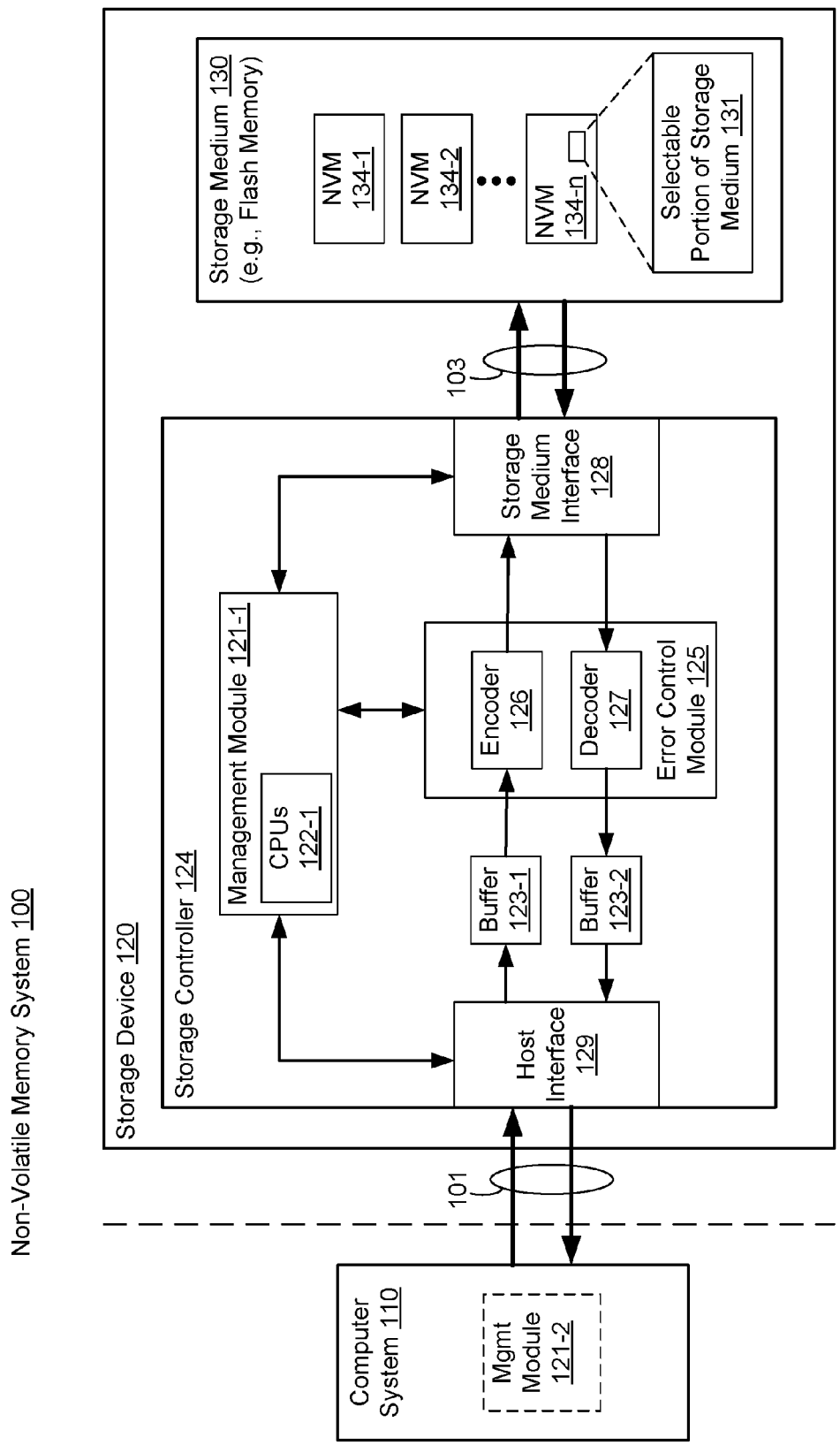
FIG. 1 is a block diagram illustrating an implementation of a non-volatile memory system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices used to enable adaptive verify voltage adjustment in memory devices. Some implementations include systems, methods and/or devices to adaptively adjust a verify voltage to reduce storage raw bit error rate.

(A1) More specifically, some embodiments include a method of recycling data in a non-volatile memory system. The method includes determining occurrences of triggering events, wherein the triggering events include: data reclamation events, urgent data integrity recycling events, and scheduled data integrity recycling events. The data reclamation events include events that each corresponds to the occurrence of one or more host data write operations in accordance with a target reclamation to host write ratio. A respective urgent data integrity recycling event occurs when a respective memory portion of the non-volatile memory system satisfies predefined urgent read disturb criteria. The scheduled data integrity recycling events include events that occur at a rate corresponding to a projected quantity of memory units for which data integrity recycling is to be performed by the non-volatile memory system over a period of time. The method further includes recycling, in response to each of a plurality of triggering events, data in a predefined quantity of memory units from a source memory portion to a target memory portion of the non-volatile memory system.

(A2) In some embodiments of the method of A1, each of the urgent data integrity recycling events and the scheduled data integrity recycling events occurs when a trigger timeout period expires. The trigger timeout period is set to distinct values in response to different predefined data integrity recycling conditions of the non-volatile memory system.

(A3) In some embodiments, the method of A2 further includes resetting a timer to restart the trigger timeout period, in response to recycling data from a respective source memory portion to a respective target memory portion of the non-volatile memory system.

(A4) In some embodiments of the method of A1, the trigger timeout period is set to a predefined minimum timeout value in response to detecting that a memory portion satisfies the predefined urgent read disturb criteria.

(A5) In some embodiments, the method of A1 further includes, at predefined times, determining a primary trigger timeout period in accordance with the projected quantity of memory units for which data integrity recycling is to be performed by the non-volatile memory system over the period of time.

(A6) In some embodiments, the method of A1 further includes: (1) providing one or more collections of memory portions each including one or more memory portions based on time attributes associated with the respective memory portions, wherein the one or more collections of memory portions are ordered based on the time attributes of the respective memory portions included in the respective collections of memory portions, and (2) at a predefined time period, selecting the source memory portion from respective memory portions of a first set of collections of memory portions for data integrity recycling, wherein the first set of collections is determined based on expiration times of the respective collections.

(A7) In some embodiments of the method of A1, a respective scheduled data integrity recycling event corresponds to a determination that one or more respective memory portions of the non-volatile memory system satisfies predefined non-urgent read disturb criteria.

(A8) In some embodiments, the method of A7 further includes selecting the source memory portion from a list of memory portions of the non-volatile memory system that satisfies the predefined non-urgent read disturb criteria.

(A9) In some embodiments of the method of A1, a respective scheduled data integrity recycling event corresponds to a determination that one or more respective memory portions of the non-volatile memory system satisfy predefined fault criteria.

(A10) In some embodiments, the method of A9 further includes selecting the source memory portion from a list of memory portions of the non-volatile memory system that satisfies the predefined fault criteria.

(A11) In some embodiments, in response to determining occurrences of a first type of non-urgent recycling events and a second type of the non-urgent recycling events, wherein a determination of occurrence of a non-urgent recycling event corresponds to a respective scheduled data integrity recycling event, the method of A1 further includes: (1) calculating a first timeout period for the first type of the non-urgent recycling event, and a second timeout period for the second type of the non-urgent recycling event, (2) calculating a hybrid timeout period in accordance with the first timeout period and the second timeout period, (3) selecting a source memory portion based on a predetermined priority between the first type of the non-urgent recycling event and the second type of the non-urgent recycling event, and (4) recycling data from the source memory portion to the target memory portion of the non-volatile memory system in accordance with the calculated hybrid timeout period.

(A12) In some embodiments, the method of A1 further includes selecting the target memory portion in accordance with wear leveling criteria.

(A13) In some embodiments, the method of A1 further includes storing, for each memory portion, one or more attributes selected from the set consisting of: a time attribute, one or more read disturb counts or status values, a fault attribute, a number of memory units having valid data, a number of memory units having invalid data, and a wear leveling attribute.

(A14) In some embodiments, the method of A1 further includes: (1) calculating a first quantity, corresponding to a projected quantity of memory units to be recycled within a prior predefined period, (2) determining a second quantity, corresponding to a quantity of memory units recycled in the prior predefined period, (3) determining an adjustment factor based on the first quantity and second quantity, and (4) adjusting the trigger timeout period value in accordance with the adjustment factor.

(A15) In some embodiments, the method of A1 further includes: (1) detecting an occurrence of a critical data reclamation event or an urgent data integrity recycling event, (2) in accordance with detecting a critical data reclamation event, prioritizing recycling data from a source memory portion selected in accordance with data reclamation criteria over recycling data corresponding to the scheduled data integrity recycling events, and (3) in accordance with detecting an urgent data integrity recycling event, prioritizing recycling data from a source memory portion selected from a list of memory portions of the non-volatile memory system that satisfy predefined urgent read disturb criteria over recycling data corresponding to the scheduled data integrity recycling events.

(A16) In another aspect, a non-volatile memory system includes non-volatile memory, one or more processors, and memory storing one or more programs, which when executed by the one or more processors cause the non-volatile memory system to perform the method of any of A1-A15, described above.

(A17) In yet another aspect, a non-transitory computer readable storage medium stores one or more programs configured for execution by one or more processors of a non-volatile memory system, the one or more programs including instructions that when executed by the one or more processors cause the non-volatile memory system to perform the method of any of A1-A15, described above.

(A18) In yet another aspect, a non-volatile memory system includes means for determining occurrences of triggering events, wherein the triggering events include data reclamation events, urgent data integrity recycling events, and scheduled data integrity recycling events. The data reclamation events include events that each corresponds to the occurrence of one or more host data write operations in accordance with a target reclamation to host write ratio, a respective urgent data integrity recycling event occurs when a respective memory portion of the non-volatile memory system satisfies predefined urgent read disturb criteria, and the scheduled data integrity recycling events include events that occur at a rate corresponding to a projected quantity of memory units for which data integrity recycling is to be performed by the non-volatile memory system over a period of time. The system further includes means for recycling, in response to each of a plurality of triggering events, data in a predefined quantity of memory units from a source memory portion to a target memory portion of the non-volatile memory system.

(A19) In yet another aspect, the non-volatile memory system of A18 is further configured to perform the method of any of A2-A15, described above.

Numerous details are described herein to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a block diagram illustrating an implementation of a non-volatile memory system 100, in accordance with some embodiments. While some example features are illustrated, various other features have not been illustrated for the sake of brevity and so as not to obscure pertinent aspects of the example embodiments disclosed herein. To that end, as a non-limiting example, non-volatile memory system 100 includes a storage device 120 (also sometimes called an information storage device, or a data storage device, or a memory device), which includes a storage controller 124 and a storage medium 130, and is used in conjunction with or includes a computer system 110 (e.g., a host system or a host computer).

In some embodiments, storage medium 130 is a single flash memory device while in other embodiments storage medium 130 includes a plurality of flash memory devices. In some embodiments, storage medium 130 is NAND-type flash memory or NOR-type flash memory. In some embodiments, storage medium 130 includes one or more three-dimensional (3D) memory devices. Further, in some embodiments, storage controller 124 is a solid-state drive (SSD) controller. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 includes one or more storage devices 120.

Computer system 110 is coupled to storage controller 124 through data connections 101. However, in some embodiments computer system 110 includes storage controller 124, or a portion of storage controller 124, as a component and/or as a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110. In some embodiments, computer system 110 does not have a display and other user interface components.

Storage medium 130 is coupled to storage controller 124 through connections 103. Connections 103 are sometimes called data connections, but typically convey commands in addition to data, and optionally convey metadata, error correction information and/or other information in addition to data values to be stored in storage medium 130 and data values read from storage medium 130.

In some embodiments, however, storage controller 124 and storage medium 130 are included in the same device (i.e., an integrated device) as components thereof. Furthermore, in some embodiments, storage controller 124 and storage medium 130 are embedded in a host device (e.g., computer system 110), such as a mobile device, tablet, other computer or computer controlled device, and the methods described herein are performed, at least in part, by the embedded storage controller.

Storage medium 130 may include any number (i.e., one or more) of memory devices (e.g., NVM 134-1, NVM 134-2 through NVM 134-n) including, without limitation, persistent memory or non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives. Additionally, and/or alternatively, flash memory device(s) can also be configured for relatively smaller-scale applications such as personal flash drives or hard-disk replacements for personal, laptop, and tablet computers.

Memory devices (e.g., NVM 134-1, NVM 134-2, etc.) of storage medium 130 include addressable and individually selectable blocks, such as selectable portion of storage medium 131 (also referred to herein as selected portion 131). In some embodiments, the individually selectable blocks (sometimes called erase blocks) are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for writing data to or reading data from the flash memory device.

In some embodiments, storage controller 124 includes a management module 121-1, a host interface 129, an input buffer 123-1, an output buffer 123-2, an error control module 125 and a storage medium I/O interface 128. Storage controller 124 may include various additional features that have not been illustrated for the sake of brevity and so as not to obscure pertinent features of the example embodiments disclosed herein, and a different arrangement of features may be possible.

Host interface 129 provides an interface to computer system 110 through data connections 101. Similarly, storage medium I/O 128 provides an interface to storage medium 130 though connections 103. In some embodiments, storage medium I/O 128 includes read and write circuitry, including circuitry capable of providing reading signals to storage medium 130 (e.g., reading threshold voltages for NAND-type flash memory).

In some embodiments, management module 121-1 includes one or more processing units 122-1 (sometimes herein called CPUs, processors, or hardware processors, and sometimes implemented using microprocessors, microcontrollers, or the like) configured to execute instructions in one or more programs (e.g., in management module 121-1). In some embodiments, the one or more CPUs 122-1 are shared by one or more components within, and in some cases, beyond the function of storage controller 124. Management module 121-1 is coupled to host interface 129, error control module 125, and storage medium I/O 128 in order to coordinate the operation of these components. In some embodiments, one or more modules of management module 121-1 are implemented in management module 121-2 of computer system 110. In some embodiments, one or more processors of computer system 110 (not shown) are configured to execute instructions in one or more programs (e.g., in management module 121-2). Management module 121-2 is coupled to storage device 120 in order to manage the operation of storage device 120.

Error control module 125 is coupled to storage medium I/O 128, input buffer 123-1, output buffer 123-2, and management module 121-1. Error control module 125 is provided to limit the number of uncorrectable errors inadvertently introduced into data during writes to memory or reads from memory. In some embodiments, error control module 125 is executed in software by the one or more CPUs 122-1 of management module 121-1, and, in other embodiments, error control module 125 is implemented in whole or in part using special purpose circuitry to perform data encoding and decoding functions. To that end, error control module 125 includes an encoder 126 and a decoder 127. Encoder 126 encodes data by applying an error control code to produce a codeword, which is subsequently stored in storage medium 130.

When the encoded data (e.g., one or more codewords) is read from storage medium 130, decoder 127 applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

During a write operation, input buffer 123-1 receives data to be stored in storage medium 130 from computer system 110. The data held in input buffer 123-1 is made available to encoder 126, which encodes the data to produce one or more codewords. The one or more codewords are made available to storage medium I/O 128, which transfers the one or more codewords to storage medium 130 in a manner dependent on the type of storage medium being utilized.

A read operation is initiated when computer system (host) 110 sends one or more host read commands (e.g., via data connections 101) to storage controller 124 requesting data from storage medium 130. Storage controller 124 sends one or more read access commands to storage medium 130, via storage medium I/O 128, to obtain raw read data in accordance with memory locations (addresses) specified by the one or more host read commands. Storage medium I/O 128 provides the raw read data (e.g., comprising one or more codewords) to decoder 127. If the decoding is successful, the decoded data is provided to output buffer 123-2, where the decoded data is made available to computer system 110. In some embodiments, if the decoding is not successful, storage controller 120 may resort to a number of remedial actions or provide an indication of an irresolvable error condition.

While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called fast page), and (2) an upper page (sometimes called slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism or ECC code) is a choice made when data is actually written to the storage media.

As an example, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection (also sometimes called data recycling). After garbage collection, the new block contains the pages with valid data and may have free pages that are available for new data to be written, and the old block can be erased so as to be available for new data to be written. Since flash memory can only be programmed and erased a limited number of times, the efficiency of the algorithm used to pick the next block(s) to re-write and erase has a significant impact on the lifetime and reliability of flash-based storage systems.

Write amplification is a phenomenon where the actual amount of physical data written to a storage medium (e.g., NVM devices 140, 142 in storage device 120) is a multiple of the logical amount of data written by a host (e.g., computer system 110, sometimes called a host) to the storage medium. As discussed above, when a block of storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation:

$$\frac{\text{amount of data written to a storage medium}}{\text{amount of data written by a host}}$$

One of the goals of any flash memory based data storage system architecture is to reduce write amplification as much as possible so that available endurance is used to meet storage medium reliability and warranty specifications. Higher system endurance also results in lower cost as the storage system may need less over-provisioning. By reducing write amplification, the endurance of the storage medium is increased and the overall cost of the storage system is decreased. Generally, garbage collection is performed on erase blocks with the fewest number of valid pages for best performance and best write amplification.

Flash memory devices utilize memory cells to store data as electrical values, such as electrical charges or voltages. Each flash memory cell typically includes a single transistor with a floating gate that is used to store a charge, which modifies the threshold voltage of the transistor (i.e., the voltage needed to turn the transistor on). The magnitude of the charge, and the corresponding threshold voltage the charge creates, is used to represent one or more data values. In some embodiments, during a read operation, a reading threshold voltage is applied to the control gate of the transistor and the resulting sensed current or voltage is mapped to a data value.

The terms "cell voltage" and "memory cell voltage," in the context of flash memory cells, means the threshold voltage of the memory cell, which is the minimum voltage that needs to be applied to the gate of the memory cell's transistor in order for the transistor to conduct current. Similarly, reading threshold voltages (sometimes also called reading signals and reading voltages) applied to a flash memory cells are gate voltages applied to the gates of the flash memory cells to determine whether the memory cells conduct current at that gate voltage. In some embodiments, when a flash memory cell's transistor conducts current at a given reading threshold voltage, indicating that the cell voltage is less than the reading threshold voltage, the raw data value for that read operation is a "1" and otherwise the raw data value is a "0."

Figure 2:
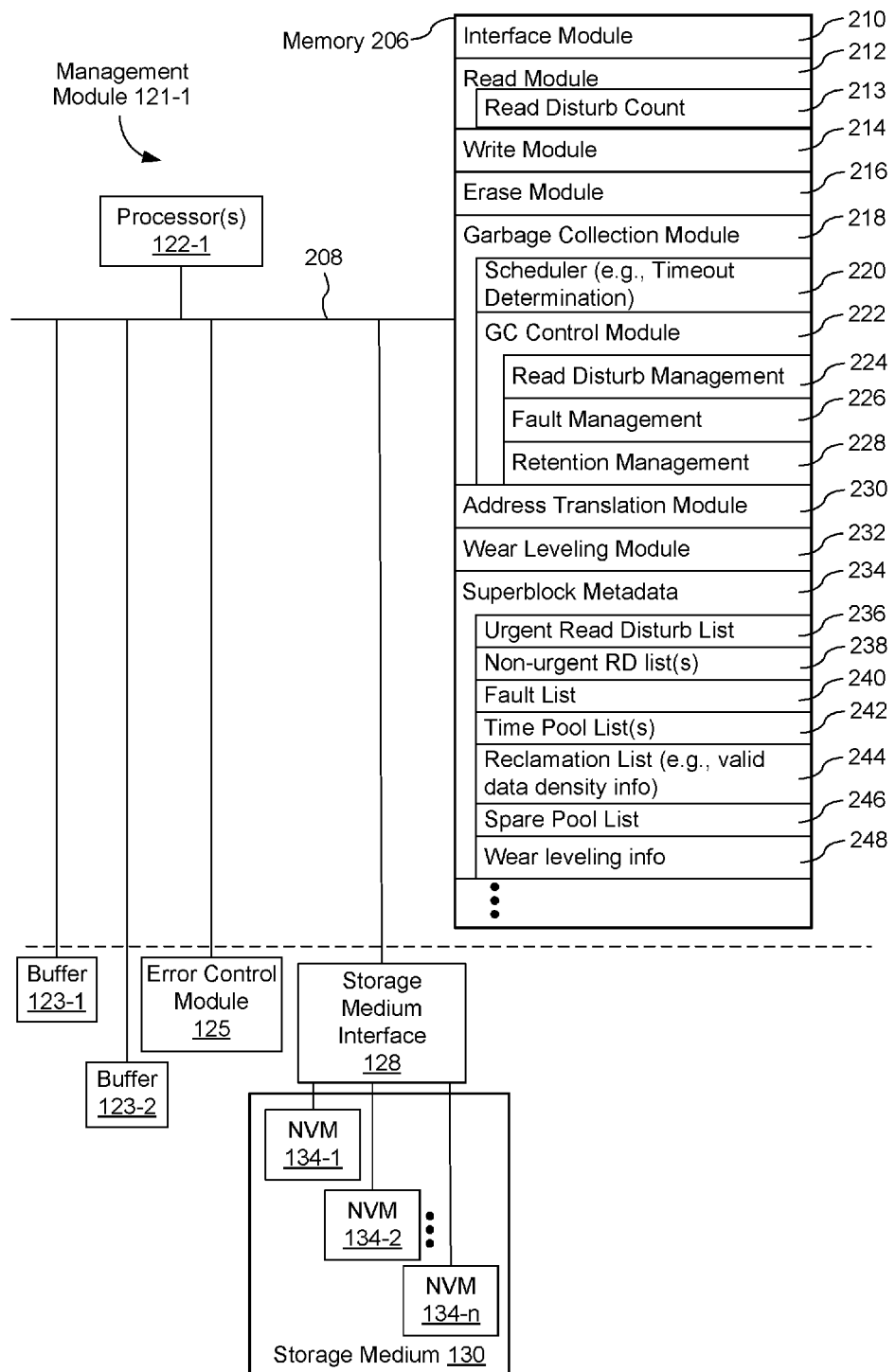
FIG. 2 is a block diagram illustrating a memory management module of a non-volatile memory controller, in accordance with some embodiments.

FIG. 2 is a block diagram illustrating an implementation of a management module 121-1 (hereinafter management module 121 unless specifically designated otherwise), in accordance with some embodiments. Management module 121 typically includes one or more processing units 122-1 (sometimes herein called CPUs, processors, or hardware processors, and sometimes implemented using microprocessors, microcontrollers, or the like) for executing modules, programs and/or instructions stored in memory 206 and thereby performing processing operations; memory 206 (sometimes herein called controller memory); and one or more communication buses 208 for interconnecting these components. Communication buses 208 optionally include circuitry (sometimes called a chipset) that interconnects and controls communications between system components. In some embodiments, management module 121 is coupled to buffers 123-1 and 123-2, error control module 125, and storage medium I/O 128 by communication buses 208. Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from processor(s) 122-1. Memory 206, or alternately the non-volatile memory device(s) within memory 206, comprises a non-transitory computer readable storage medium. In some embodiments, memory 206, or the computer readable storage medium of memory 206 stores the following programs, modules, and data structures, or a subset or superset thereof:

- an interface module 210 used for communicating with other components, such as non-volatile memory devices 134, and computer system 110;
- a read module 212 used for reading from non-volatile memory devices 134;
- in some embodiments, read module 212 includes a read disturb counting module 213 for maintaining read disturb counts for various memory portions (e.g., blocks or portions of blocks) of storage medium 130;
- a write module 214 used for writing to non-volatile memory devices 134;
- an erase module 216 used for erasing data from non-volatile memory devices 134;
- a garbage collection module 218 used for controlling a garbage collection process in a storage medium (e.g., storage medium 130, FIG. 1), the garbage collection module 218 including, but not limited to:
  - a scheduler 220 used for determining a data recycling rate and/or a timeout period for a garbage collection process and for controlling a timer, sometimes called a garbage collection triggering timer since the timer is used to trigger or initiate garbage collection operations; and
  - a garbage collection control module 222 used for determining triggering events for garbage collection, determining priority level of events, and selecting source memory portions for garbage collection; in some embodiments garbage collection module 222 includes:
    - a read disturb management module 224 used for handling read disturb events with respect to scheduling data integrity garbage collection;
    - a fault management module 226 used for managing faulty states of respective memory portions (e.g., blocks or superblocks); and
    - a retention management module 228 used for managing retention of data before it becomes unreadable due to the passage of time or other data integrity data degradation mechanisms;
- an address translation module 230 used for mapping logical addresses to physical addresses;
- a wear leveling module 232 used for determining memory portions (i.e., pages, blocks, or superblocks) of a storage medium (e.g., storage medium 130, FIG. 1), taking into account wear leveling criteria (e.g., to, ideally, evenly wear memory portions of the storage medium 130); and superblock metadata 234, including:

an urgent read disturb list 236 including a list of superblocks whose read disturb counts satisfies a predefined urgent read disturb criteria (e.g., a list of superblocks that each having a least one block or memory portion whose read disturb count satisfies an urgent read disturb threshold);

a non-urgent read disturb list 238 including a list of superblocks whose read disturb counts satisfies predefined non-urgent read disturb criteria (e.g., a list of superblocks that each have at least one block or memory portion whose read disturb count satisfies a respective threshold level, or one or more such threshold levels);

a fault list 240 including a list of superblocks ready for data integrity recycling after fault detection;

time pool list(s) 242 (also sometimes called data retention lists) including one or more lists for respective time pools; each time pool list includes a list of superblocks assigned to the time pool and time pool information such as a time attribute (e.g., expiration time) of the time pool; a respective time pool list may optionally include a metric (e.g., a valid page count) for each superblock indicating the amount of valid data in the superblock;

a reclamation list 244 including valid data density information associated with each superblock; for example, in some embodiments reclamation list 244 includes a list of superblocks with less than a threshold number of valid pages, optionally ordered in accordance with the quantity of valid pages in each of the superblocks; in some embodiments, management module 121-1 includes multiple reclamation lists, each listing superblocks having a number of valid pages in a predefined range (e.g., multiple lists, each covering a distinct range of the possible number of valid pages per superblock);

a spare pool list 246 including a list of erased superblocks ready to store data (or, alternatively, a list of empty superblocks having no valid data, some of which may not yet be erased) and related spare pool information such as spare pool size (e.g., number of erased superblocks in the spare pool); in some embodiments, the spare pool list 246 includes a critical data reclamation flag that is set when the size of the spare pool size falls below a predefined threshold, and that is reset when the size of the spare pool size satisfies the predefined threshold (e.g. is larger than the predefined threshold, or alternatively, equal to or larger than the predefined threshold); and wear leveling information 248 for recording wear leveling information for each superblock.

Each of the above identified elements may be stored in one or more of the previously mentioned memory devices that together form memory 206, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the computer readable storage medium of memory 206, provide instructions for implementing respective operations in the methods described below with reference to FIGS. 3A-3B and 4A-4E.

Although FIG. 2 shows management module 121-1, FIG. 2 is intended more as a functional description of the various features which may be present in a management module, or non-volatile memory controller, than as a structural schematic of the embodiments described herein. In practice, and as recognized by those of ordinary skill in the art, items shown separately could be combined and some items could be separated. Further, as noted above, in some embodiments, one or more modules of management module 121-1 are implemented in management module 121-2 of computer system 110.

In some embodiments, memory devices (e.g., NVM 134-1, NVM 134-2, etc.) of storage medium 130 include one or more superblocks. Superblocks may be respective selectable portions of storage medium 131 (e.g., selected portion 131). In some embodiments, a respective superblock includes a group of blocks that share approximately similar characteristics such as relative data age in respective blocks, wear attributes of respective blocks, and/or other characteristics. In some embodiments, each respective superblock includes a group of blocks having the same physical address offset or the same relative physical address, relative to respective starting addresses, in a set of non-volatile memory die or a set of non-volatile memory arrays. In some examples, respective blocks in a superblock are garbage collected as a group, and are erased concurrently (e.g., during overlapping time periods). A respective superblock can be a logical grouping or a virtual grouping of a plurality of blocks. The management module 121-1 can manage data on a superblock level to reduce the volume of information to be tracked and to improve the data management efficiency.

Figure 3A:
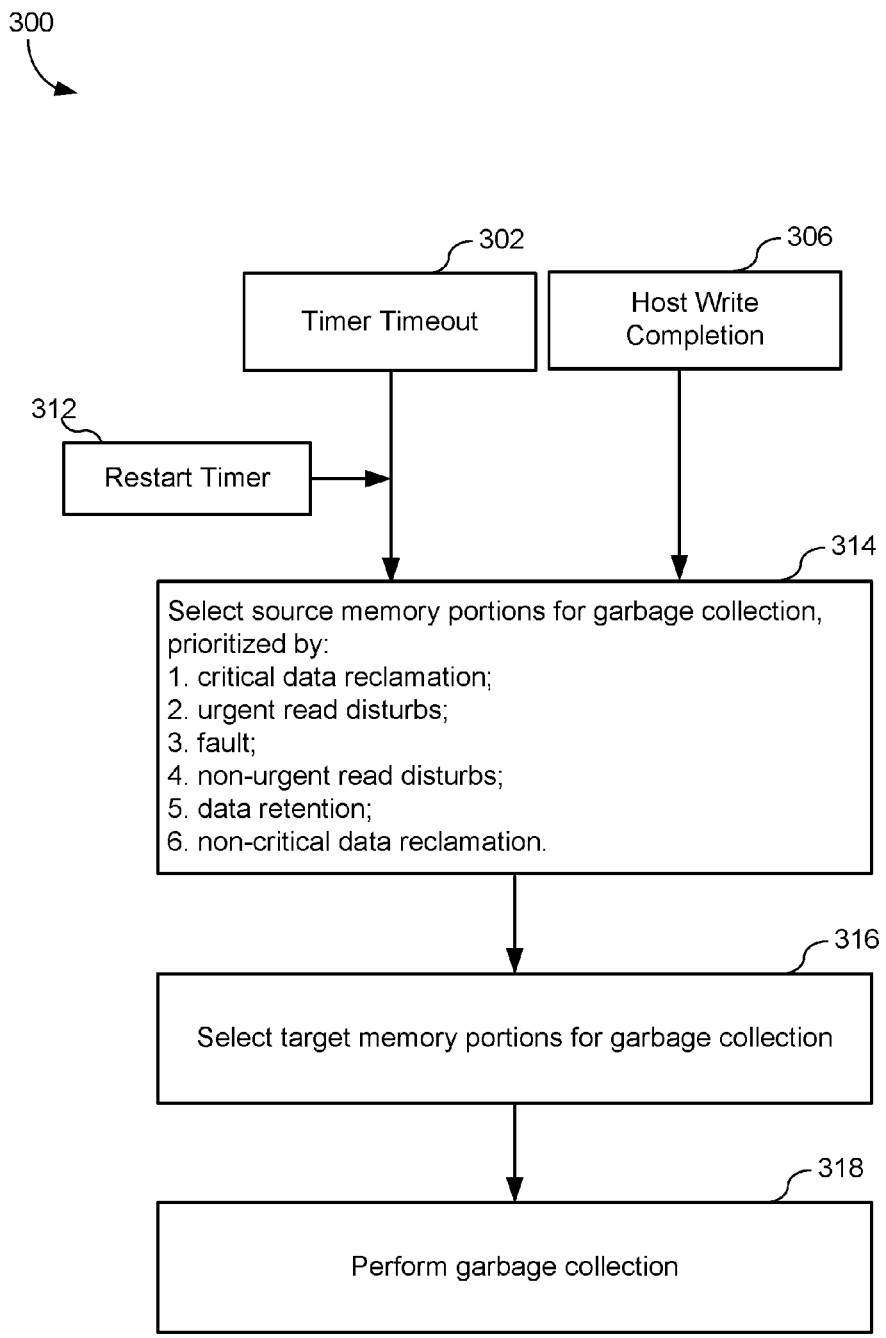
FIG. 3A illustrates a conceptual flowchart representation of a method of performing data reclamation and data integrity garbage collection in a non-volatile memory system, in accordance with some embodiments.

FIG. 3A illustrates a conceptual flowchart representation of a method 300 of performing data reclamation and data integrity garbage collection in a non-volatile memory system, in accordance with some embodiments. With reference to the non-volatile memory system 100 pictured in FIG. 1, in some embodiments, method 300 is performed by a storage device (e.g., storage device 120, FIG. 1) or one or more components of the storage device (e.g., storage controller 124 of storage device 120, FIG. 1, or management module 121-1). In some embodiments, method 300 is governed by instructions that are stored in a non-transitory computer readable storage medium and that are executed by one or more processors of a device, such as the one or more processing units (CPUs) 122-1 of management module 121-1 (FIG. 1).

In some embodiments, some of the operations (or alternatively, steps) of method 300 are performed at a host system (e.g., computer system 110) that is operatively coupled with the storage device, and other operations of method 300 are performed at the storage device. In some of these embodiments, method 300 is governed, at least in part, by instructions that are stored in a non-transitory computer readable storage medium and that are executed by one or more processors (e.g., hardware processors) of the host system (the one or more processors of the host system are not shown in FIG. 1).

With reference to FIG. 2, in some embodiments, the operations of method 300 are performed, at least in part, by a read module (e.g., read module 212, FIG. 2), a write module (e.g., write module 214, FIG. 2), an erase module (e.g., erase module 216, FIG. 2), and a garbage collection module (garbage collection module 218, FIG. 2). For ease of explanation, the following describes method 300 as performed by a storage device (e.g., by storage device 120, FIG. 1).

Method 300 begins, in some embodiments, in accordance with a determination that a timer timeout event (302) occurs. The storage device includes a timer, sometimes called the garbage collection triggering timer, for timing one or more garbage collection events associated with the storage device. In some embodiments, the timer timeout event (302) occurs at the end of a time period, the duration of which is determined by the storage device (e.g., using method 350, described below with reference to FIG. 3B). Expiration of the timer is a triggering event, or alternatively causes a triggering event. Depending on the state of the storage system, the triggering event may initiate a data reclamation garbage collection operation (also sometimes called data reclamation recycling) which is performed to recycle one or more superblocks (and/or blocks) to reclaim more space for writing new data. Alternatively, the triggering event may initiate a data integrity garbage collection operation (also sometimes called data integrity recycling) which is performed to recycle one or more superblocks (and/or blocks) to refresh data stored in the respective one or more superblocks (and/or blocks) so as to maintain data integrity. In some circumstances, method 300 begins in accordance with a determination that a host write operation has completed (306).

In some embodiments, one or more triggering events initiate data reclamation garbage collection and/or data integrity garbage collection. In some embodiments, data integrity garbage collection includes, but is not limited to, urgent read disturb garbage collection (also sometimes called urgent read disturb recycling), non-urgent read disturb garbage collection (also sometimes called non-urgent read disturb recycling), fault garbage collection (also sometimes called fault disturb recycling), and data retention garbage collection (also sometimes called data retention recycling).

A data reclamation garbage collection event corresponds to occurrences of one or more host data write operations in accordance with a target reclamation recycle ratio (also sometimes called a target reclamation to host write ratio). The target reclamation recycle ratio is determined to maintain the spare pool at a target spare block pool size, and to maintain relatively uniform and even device performance. In some embodiments, a current reclamation recycle ratio is expressed as:

$$\text{recycle ratio} = \frac{\text{amount of data written for reclamation recycling}}{\text{amount of data written by a host}}$$
$$= \text{write amplification} - 1$$

The current reclamation recycle ratio is periodically checked against the target reclamation recycle ratio, and the reclamation recycle rate is adjusted accordingly. For example, if the target recycle ratio is equal to 2, and the size of each data write operation is "N" pages (e.g., 8 pages, each having a predefined page size, such as 32 KB), each time a host data write operation is completed (306), two garbage collection operations (314-318) are triggered. In another example, if the target recycle ratio is equal to a fractional value, such as 1.8, a value corresponding to the ratio is added to a count each time a host write operation completes, one or more garbage collection operations are triggered (e.g., the number of garbage collection operations triggers is an integer number corresponding to the integer portion of the count), and the count is adjusted accordingly (e.g., by subtracting the number of triggered garbage collection operations from the count). It is noted that in some embodiments other definitions of a recycle ratio may be used, but typically those definitions are mathematically equivalent to the definition given above.

A respective read of a memory unit (e.g., a page) disturbs other memory units on the same memory portion (e.g., a block), and the performance of a large number of such reads (e.g., greater than a threshold number, typically determined by testing similar memory devices) will eventually cause the number of bit errors in the memory unit to exceed the error correction capability of the error correction code stored with the data. A read disturb garbage collection operation is performed to refresh data of a memory portion (e.g., a superblock) before read disturbs cause errors that cannot be corrected through the use of error correction codes stored with the data in the memory portion, and data cannot be reliable read from the memory portion or subset of the memory portion. Read disturb counts are maintained by storage device 120, FIG. 1, or a component thereof such as read disturb counting module 213, FIG. 2. In some embodiments, read disturb counts of a block increase in response to performing one or more read operations in this block. In some embodiments, read disturb counts of a block increase in response to performing one or more read operations in any of one or more predefined blocks neighboring this block, or in specific portions of one or more neighboring blocks. In one example, when each read disturb count is stored as a sixteen bit number, the read disturb count has a potential range of 0 to 65535. The read disturb count for a memory portion (e.g., a block or a superblock) is initialized to 0 or alternatively another relatively low value, such as 10, each time the memory portion is erased, and that value is incremented by a set amount (e.g., 1) each time a read operation is performed in the memory portion or in a predefined neighboring region of the storage medium.

Alternatively, read disturb counts can be implemented using a decrementing counter for each memory portion for which a read disturb is to be kept. In such embodiments, when the memory portion is erased, or when data is first written to the memory portion after being erase, the read disturb count is set to an initial value corresponding to a read disturb limit. Each time a read operation occurs in the memory portion, or optionally a predefined neighboring memory portion, the read disturb count for the memory portion is decremented, typically by one, but optionally by a different amount in certain circumstances (e.g., by a larger value, such as 10, if the memory portion is or is in an open block). When the read disturb count for a respective memory portion reaches (i.e., has been decremented to) a value corresponding to an urgent or non-urgent read disturb threshold, a corresponding action (e.g., one of the data integrity scheduling actions described below) is performed.

In some circumstances, a plurality of blocks in a superblock have similar read disturb counts or respective read disturb counts within a certain range. However, the read disturb count counts for the plurality of blocks in a superblock are independent, based on read operations in each of those blocks, and thus may vary widely.

In some embodiments, a read disturb count (at any point in time) for a superblock is determined by the block in the superblock that has the highest read disturb count (at that point in time). Read disturb garbage collection may include urgent read disturb recycling events and non-urgent read disturb recycling events.

In some embodiments, a respective urgent data integrity recycling event occurs when a respective memory portion (e.g., a respective block or a respective superblock) of the non-volatile memory system satisfies predefined urgent read disturb criteria. In some embodiments, a read disturb count for the respective memory portion in the non-volatile memory system satisfies the predefined urgent read disturb criteria when the read disturb count for that memory portion reaches or passes a predefined urgent read disturb threshold. For example, the predefined urgent read disturb threshold may be, or correspond to, a predefined percentage (e.g. 90%) of a maximum read disturb count for the memory portion. For example, if the maximum read disturb count for a memory portion is 40,000, the predefined urgent read disturb threshold would be, or would correspond to, a read disturb count of 36,000. When a memory portion's read disturb count satisfies the predefined urgent read disturb criteria, an identifier (e.g., a physical address) of the superblock that includes the memory portion is added to urgent read disturb list 236. Thus, superblocks having at least one memory portion satisfying the predefined urgent read disturb criteria are listed in urgent read disturb list 236. Alternatively, an identifier (e.g., a physical address) of the memory portion is added to urgent read disturb list 236, and the corresponding superblocks are identified based on the identifiers of the memory portions (e.g., erase blocks) listed in urgent read disturb list 236.

In some embodiments, one or more triggering events occur when one or more scheduled data integrity recycling events occur. A scheduled data integrity recycling event occurs at a rate corresponding to a projected quantity of memory units (e.g., pages) or memory portions (e.g., blocks or superblocks) for which data integrity recycling is to be performed by the non-volatile memory system over a period of time.

In some embodiments, a respective scheduled data integrity recycling event occurs when one or more respective memory portions (e.g., blocks or superblocks) of the non-volatile memory system satisfies predefined non-urgent read disturb criteria. In some embodiments, a read disturb count for the respective memory portion in the non-volatile memory system satisfies the predefined non-urgent read disturb criteria when the read disturb count for that memory portion reaches or passes (e.g., exceeds, if incrementing read disturb counters are being used, or falls below, if decrementing read disturb counters are being used) a predefined threshold value. In some embodiments, the predefined threshold value for a respective memory portion is a certain percentage (e.g., 80% or 50%) of the maximum read disturb count for the respective memory portion.

In some embodiments, the non-urgent read disturb criteria include one or more distinct criteria for initiating different levels of non-urgent read disturb garbage collection. In one example, a trigger criterion for a first level of non-urgent read disturb garbage collection includes a situation where the memory device has at least a first threshold number of memory portions (e.g., 200 superblocks) each having read disturb counts equal to or more than an intermediate-limit threshold. The intermediate-limit threshold value may be predetermined to be 50% of the maximum read disturb count for a respective superblock. In another example, a trigger criterion for a second level of non-urgent read disturb garbage collection includes a situation where the memory device has at least a second threshold number of memory portions (e.g., 8 superblocks) each having read disturb counts equal to or more than a near-limit threshold. The near-limit threshold value may be predetermined to be 80% of the maximum read disturb count for a respective superblock. The memory portions that satisfy the one or more predefined non-urgent read disturb criteria are listed in non-urgent read disturb list 238.

In some embodiments, a respective scheduled data integrity recycling event occurs when one or more respective memory portions (e.g., blocks or superblocks) of the non-volatile memory system satisfies predefined fault criteria. In some embodiments, a memory portion (e.g., a block or a superblock) satisfies the predefined fault criteria when any memory unit (e.g. a page) in the memory portion fails to be properly programmed when data is written to it, resulting in the data written to the memory unit being corrupted or unreadable due to uncorrectable errors. More generally, memory faults can occur due to any of a variety of failure mechanisms, and may be detected during write operations, read operations or erase operations. Data within a memory portion can be protected against memory faults by Flexible Redundant Array of Memory Elements (FRAME) to provide data recovery on failed pages, blocks, superblocks, die, and/or planes of storage medium 130. However, recovering from a failure in a memory portion may use up the FRAME capability, leaving other memory portions in the same group of memory portions (e.g., a superblock) unprotected. The faulty state of a memory portion can be managed by storage device 120, FIG. 1, or a component thereof such as fault management module 226, FIG. 2. In particular, a fault garbage collection is performed to remove data from a faulty memory portion before the memory portion encounters a second failure. The memory portions with detected faults are listed in fault list 240.

In some embodiments, a respective scheduled data integrity recycling event occurs when one or more respective memory portions (e.g., blocks or superblocks) of the non-volatile memory system satisfy predefined time criteria. In some embodiments, one or more collections of memory portions (e.g., time pools) are provided. The time pools can be managed by storage device 120, FIG. 1, or a component thereof such as retention management module 228, FIG. 2. An individual time pool includes one or more memory portions (e.g., superblocks) based on time attributes associated with the respective memory portions. For example, a time pool includes a group of superblocks that are written within a specific time period.

A time pool may be associated with a time attribute. The time attribute may indicate an expiration time of the superblocks included in the time pool. For example, a time pool may become expired after a predetermined period of time, such as 8 hours, a day, or a week. The time attribute of a time pool may also indicate an age of data written to the respective superblocks included in the time pool before the time pool is recycled. The one or more time pools may be ordered based on the time attributes of the respective memory portions included in the respective time pools. In some embodiments, a predetermined number N (e.g., N=12) of time pools are used to manage the superblocks of the memory device. The time pool information of respective time pools is listed in time pool list 238. The time pool information includes, but is not limited to, time attributes associated with respective time pools, and superblocks included in respective time pools.

Next, the storage device (e.g., storage device 120, FIG. 1, or a component thereof such as garbage collection control module 222, FIG. 2) selects (314) one or more source memory portions (e.g., superblocks) for garbage collection operations. In some embodiments, in response to selecting the source memory portions for recycling, the storage device (e.g., storage device 120, FIG. 1, or a component thereof such as scheduler 220, FIG. 2) restarts (312) the timer. The timer is set to a predetermined timeout period (see discussion above of timer timeout, 302). In some embodiments, the timeout period is set to distinct values in response to different predefined recycling events and conditions of the non-volatile memory system. Some examples of determining the timeout period are explained below with reference to method 350 of FIG. 3B.

In some embodiments, a predefined, ordered set of priority levels or predefined prioritization criteria are used for selecting the source memory portions. The predefined set of priority levels are used to rank garbage collection operations (e.g., including data reclamation garbage collection and data integrity garbage collection) according to predetermined priority levels associated with respective garbage collection operations. In some embodiments, garbage collection operations are ranked according to a sequence of priority levels, from a highest priority level to a lowest priority level, as follows: (1) critical data reclamation garbage collection; (2) urgent read disturb data integrity garbage collection; (3) fault garbage collection; (4) non-urgent read disturb garbage collection; (5) data retention garbage collection; and (6) non-critical data reclamation garbage collection.

At operation 314, the storage device (e.g., storage device 120, FIG. 1, or a component thereof such as garbage collection control module 222, FIG. 2) first checks (314-1) whether there is a critical data reclamation condition. In some embodiments, a critical data reclamation garbage collection operation is performed when (or, more generally, in accordance with a determination that) the spare pool size of spare pool list 246 has fallen below a predefined critical level. The storage device (e.g., storage device 120, FIG. 1, or a component thereof such as garbage collection control module 222, FIG. 2) selects (314-1) selects a superblock having an amount of valid data that meets predefined data reclamation criteria as the next source superblock. In some embodiments, the storage device uses information in reclamation list 244, for example, valid data density information of respective superblocks, to select the source superblock.

For example, the storage device selects a superblock having a lowest amount of valid data, or selects a superblock from a group of superblocks categorized as having a low amount of valid data as the next source superblock that meets the predefined data reclamation criteria. In some embodiments, the storage device takes into account both the amount of valid data in each candidate superblock and one or more wear leveling metrics of each candidate superblock when selecting the source superblock.

When there is no critical data reclamation garbage collection, the storage device (e.g., storage device 120, FIG. 1, or a component thereof such as garbage collection control module 222, FIG. 2) then checks (314-2) whether urgent read disturb list 236 is empty. If urgent read disturb list 236 is not empty, the storage device selects (314-2) a superblock from urgent read disturb list 236 as the next source superblock.

When there is no critical data reclamation garbage collection, and when urgent read disturb list 236 is empty, the storage device (e.g., storage device 120, FIG. 1, or a component thereof such as garbage collection control module 222, FIG. 2) then checks (314-3) whether fault list 240 is empty. If fault list 240 is not empty, the storage device selects (314-3) a superblock from fault list 240 as the next source superblock.

When there is no critical data reclamation garbage collection, and when both urgent read disturb list 236 and fault list 240 are empty, the storage device checks (314-4) whether non-urgent read disturb list 238 is empty. If non-urgent read disturb list 238 is not empty, the storage device selects (314-4) a superblock from non-urgent read disturb list 238 as the next source superblock. Alternatively, in some embodiments, if non-urgent read disturb list 238 is not empty, the storage device selects (314-4) a superblock from non-urgent read disturb list 238 as the next source superblock only if predefined non-urgent read disturb recycling criteria are satisfied.

In some embodiments, different levels of non-urgent read disturb garbage collection with distinct triggering criteria have different priority levels. For example, the first level of non-urgent read disturb garbage collection with the intermediate-limit threshold may have a lower priority level than the second level of non-urgent read disturb garbage collection with the near-limit threshold. In one example, the predefined non-urgent read disturb recycling criteria are satisfied if either (A) there are at least N1 (e.g., 200) superblocks in non-urgent read disturb list 238 that satisfy a first non-urgent read disturb threshold (e.g., an intermediate threshold) and a garbage collection operation on any such superblock has not been performed in the last T1 seconds (e.g., 4, 5, 6, 7, 8 or 9 seconds), or (B) there are at least N2 (e.g., 8) superblocks in non-urgent read disturb list 238 that satisfy a second non-urgent read disturb threshold (e.g., a near-limit threshold) and a garbage collection operation on any such superblock has not been performed in the last T2 seconds (e.g., 1, 2 or 3 seconds).

In some embodiments, to identify the source memory portion for recycling, the storage device checks whether any memory portions (e.g., superblocks) listed in non-urgent read disturb list 238 and categorized as satisfying the near-limit threshold have been recycled in the past T2 seconds. In accordance with a determination that none of the memory portions listed in non-urgent read disturb list 238 and categorized as satisfying the near-limit threshold have been recycled in the past T2 seconds, the storage device selects the source memory portion from the memory portions listed in non-urgent read disturb list 238 and categorized as satisfying the near-limit threshold. In accordance with a determination that any memory portion listed in non-urgent read disturb list 238 and categorized as satisfying the near-limit threshold has been recycled in the past T2 seconds, the storage device selects checks whether any memory portions (e.g., superblocks) listed in non-urgent read disturb list 238 and categorized as satisfying the intermediate threshold have been recycled in the past T1 seconds. In accordance with a determination that none of the memory portions listed in non-urgent read disturb list 238 and categorized as satisfying the intermediate threshold have been recycled in the past T1 seconds, the storage device selects the source memory portion from the memory portions listed in non-urgent read disturb list 238 and categorized as satisfying the intermediate threshold.

As noted above, in some embodiments, data retention garbage collection has a lower priority level than non-urgent read disturb garbage collection.

When there is no critical data reclamation garbage collection, urgent read disturb list 236 and fault list 240 are both empty, and predefined non-urgent read disturb recycling criteria are not satisfied, the storage device (e.g., storage device 120, FIG. 1, or a component thereof such as garbage collection control module 222, FIG. 2) then checks (314-5) whether predefined data retention criteria are satisfied. The predefined data retention criteria are satisfied if the amount of valid data in the oldest time pools is such that data integrity recycling must be performed to recycle all the data in those oldest time pools before the data in any of those oldest time pools reaches the expiration time of those time pools. Since this determination may require a significant amount of computation, the determination may be made at predefined times, such as when the timeout period is determined, and then reused each time a source superblock selection 314 is performed. If the predefined data retention criteria are satisfied, the storage device selects (314-5) one or more superblocks included in the one or more oldest time pools as the source superblock(s). In one example, the storage device selects a superblock in the oldest time pool as the source superblock. Over time, method 300 is performed multiple times, resulting in selection of all the superblocks in the one or more oldest time pools as the source superblocks for garbage collection. As a result, over time, all the superblocks in the one or more oldest time pools are garbage collected.

In some embodiments, time pools are not used for managing data retention, and instead data retention is managed through the use of background read operations, sometimes called patrol reads, during which error rates are determined for the memory portions read. During the patrol reads, which are interleaved with other operations, identifiers of superblocks whose detected error rates, or other error characteristics, meet predefined criteria are added to one or more data retention lists, which replace time pool list(s) 242. In some embodiments, a single data retention list of superblocks is maintained, while in other embodiments, two or more data retention lists of superblocks are maintained, each for superblocks satisfying different data retention recycling criteria (e.g., one list for superblocks having just one block with an error rate that satisfies an error threshold, and another list of superblocks that have more than one block with an error rate that satisfies the error threshold). In some embodiments, the error threshold corresponds to a predefined percentage (e.g., 50%) of the error correction capability of the error correction code used to protect data stored in the storage device's non-volatile storage medium. In some embodiments, garbage collection of valid data in the superblocks listed in the one or more data retention lists has a priority level lower than the superblocks in the fault list, but higher than non-urgent data reclamation.

When there is no critical data reclamation garbage collection, when urgent read disturb list 236 and fault list 240 are empty, the predefined non-urgent read disturb criteria are not satisfied, and the predefined data retention criteria are not satisfied, the storage device selects (314-6) a superblock in accordance with predefined reclamation criteria (e.g., predetermined valid data sparsity and optionally one or more wear leveling metrics) as the next source superblock.

In some embodiments, the storage device blends different types of data integrity garbage collection including fault garbage collection, non-urgent read disturb garbage collection, and data retention garbage collection. That is, when there is no critical data reclamation garbage collection, and when urgent read disturb list 236 is empty, the storage device (e.g., storage device 120, FIG. 1, or a component thereof such as scheduler 220, FIG. 2) calculates a hybrid timeout period (also sometimes called a combined timeout period) based on respective conditions of fault garbage collection, non-urgent read disturb garbage collection, and data retention garbage collection, as discussed below with reference to method 350 of FIG. 3B. The storage device (e.g., storage device 120, FIG. 1, or a component thereof such as garbage collection control module 222, FIG. 2) then selects a source superblock based on whether there are any superblocks waiting for fault garbage collection, non-urgent read disturb garbage collection, and/or data retention garbage collection and the respective priority levels for fault garbage collection, non-urgent read disturb garbage collection, and data retention garbage collection. In some embodiments, the storage device blends two or more types of data integrity garbage collection by determining a data integrity recycling rate and/or timeout period that takes into account an amount of data to be recycled during a predefined time period, and performing data integrity garbage collection operations at the determined data integrity recycling rate.

Next, the storage device (e.g., storage device 120, FIG. 1, or a component thereof such as garbage collection control module 222, FIG. 2) selects (316) one or more target memory portions (e.g., superblocks) for garbage collection operations. In some embodiments, the storage device selects the target memory portions in accordance with wear leveling criteria. For example, the storage device uses (e.g., accesses or evaluates) superblock wear leveling metadata from wear leveling information 248, and selects a target memory portion from a spare pool listed in spare pool list 246 in accordance with predetermined wear leveling criteria.

Next, the storage device (e.g., storage device 120, FIG. 1, or a component thereof such as garbage collection control module 222, FIG. 2) performs (318) a garbage collection operation, copying valid data from the selected source superblock(s) to the selected target superblock(s). As noted above, process 300 is performed each time the timer's timeout period expires (302), or the completion of a host write operation triggers one or more garbage collection operations (306).

Figure 3B:
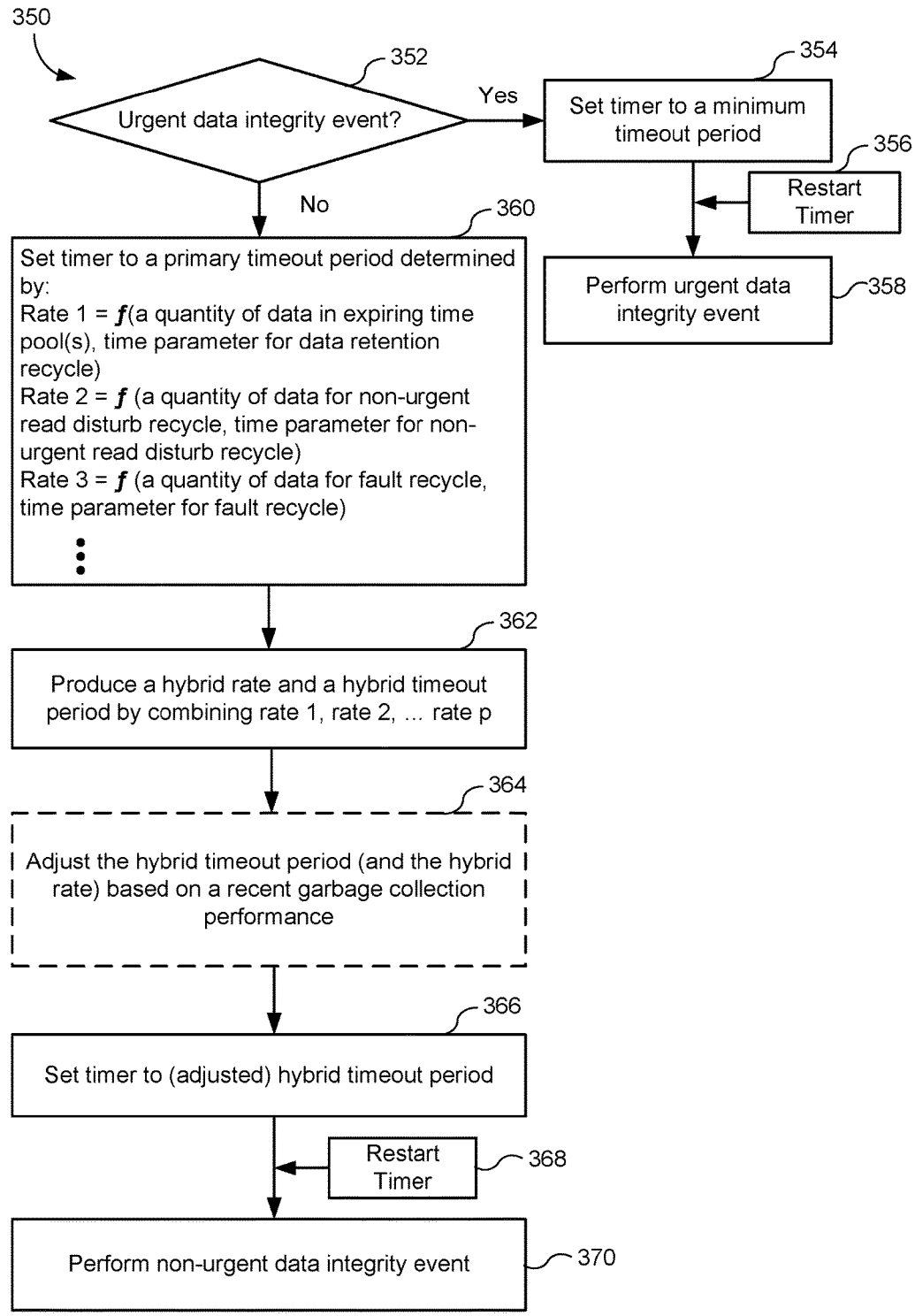
FIG. 3B illustrates a conceptual flowchart representation of a method of determining a timeout period for data integrity garbage collection in a non-volatile memory system, in accordance with some embodiments.
Figure 4B:
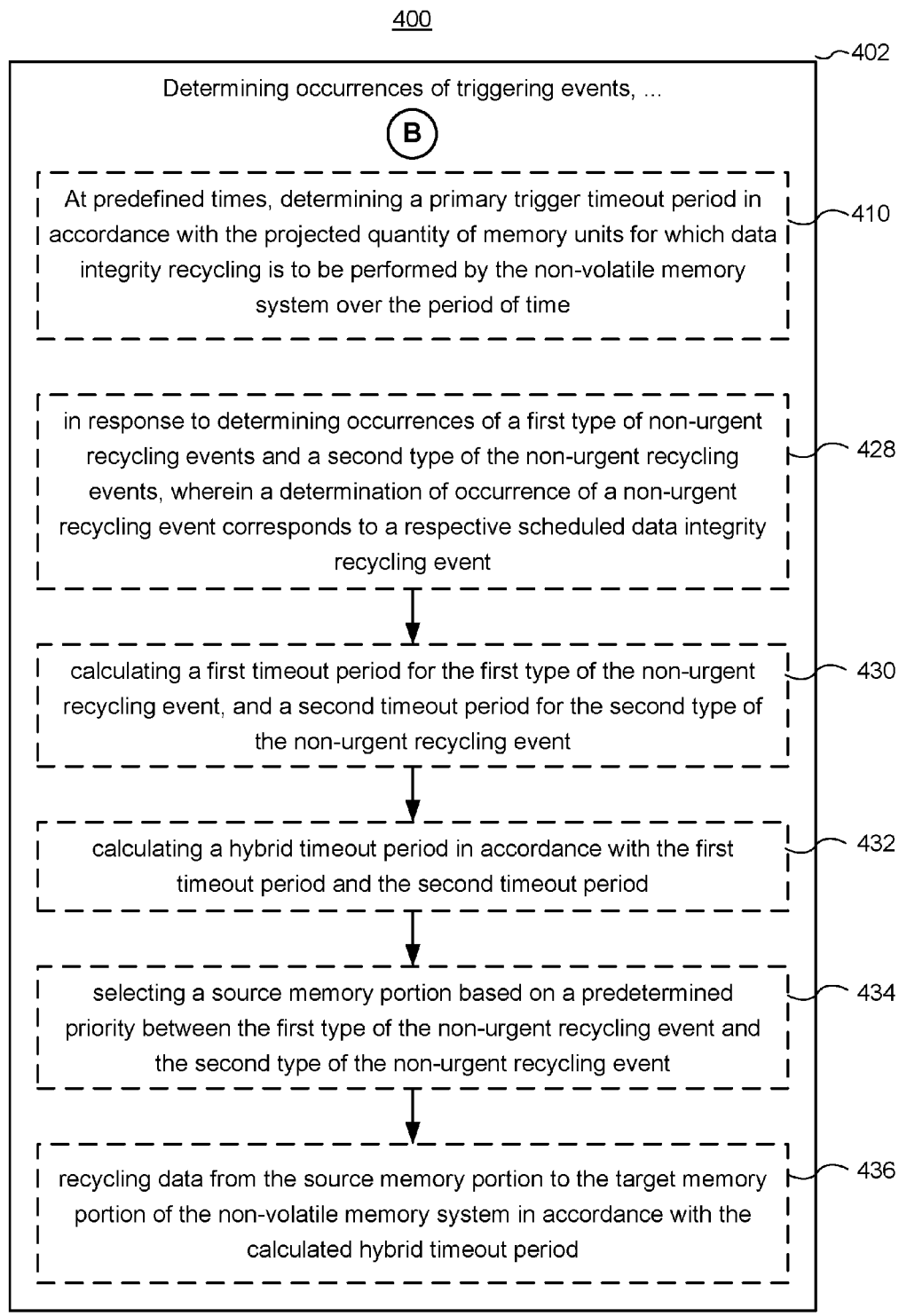
Figure 4C:
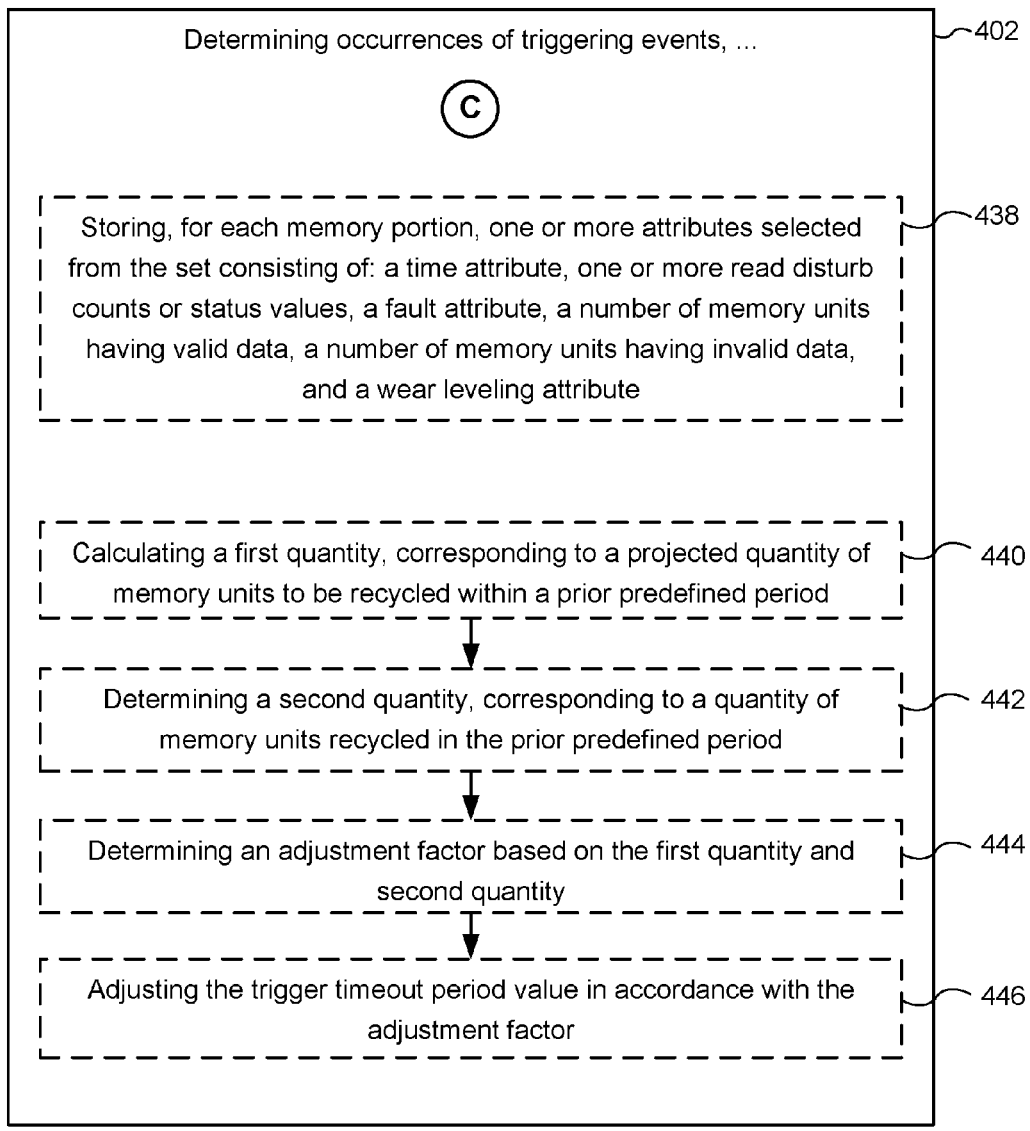
Figure 4D:
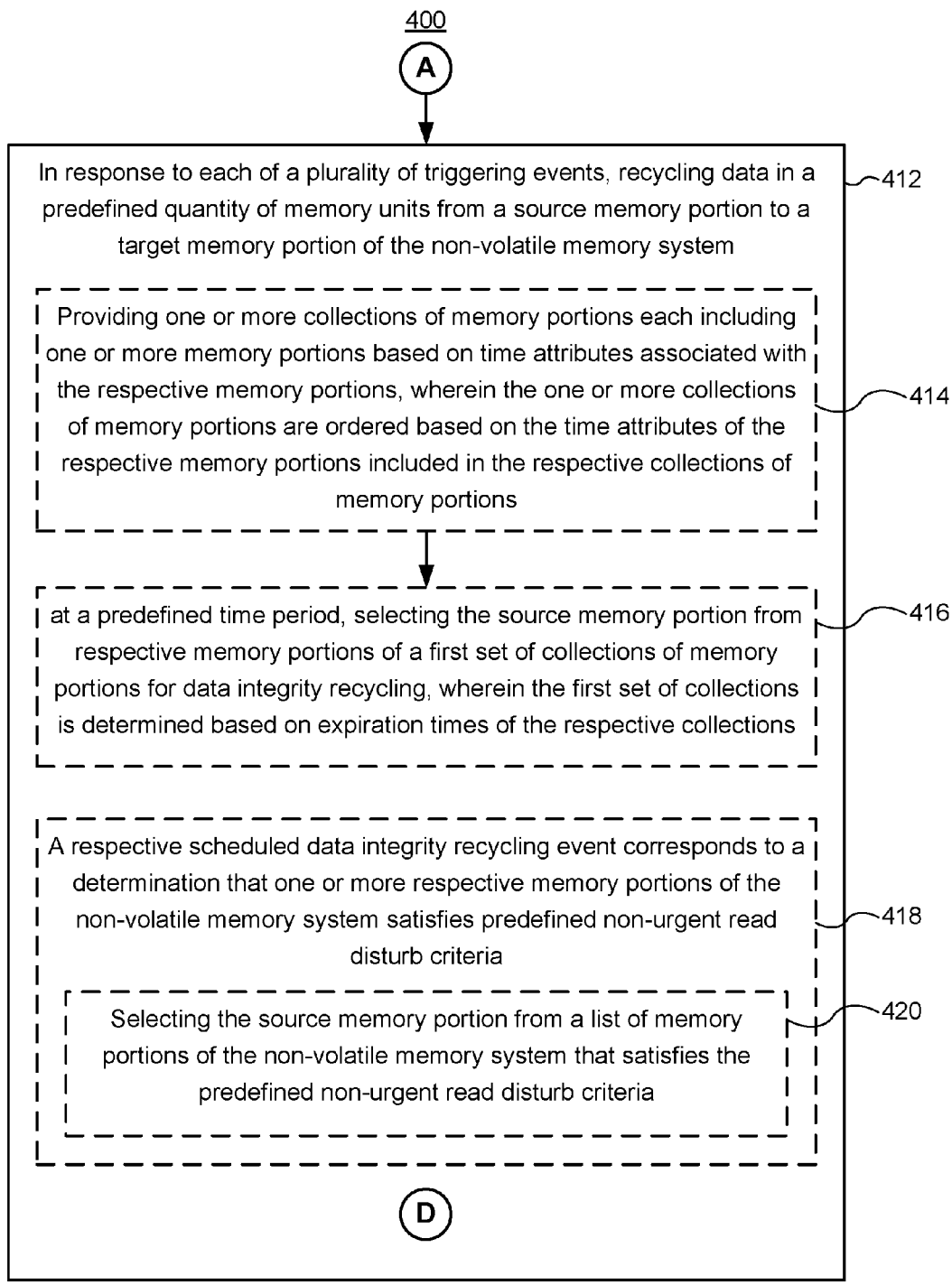
Figure 4E:
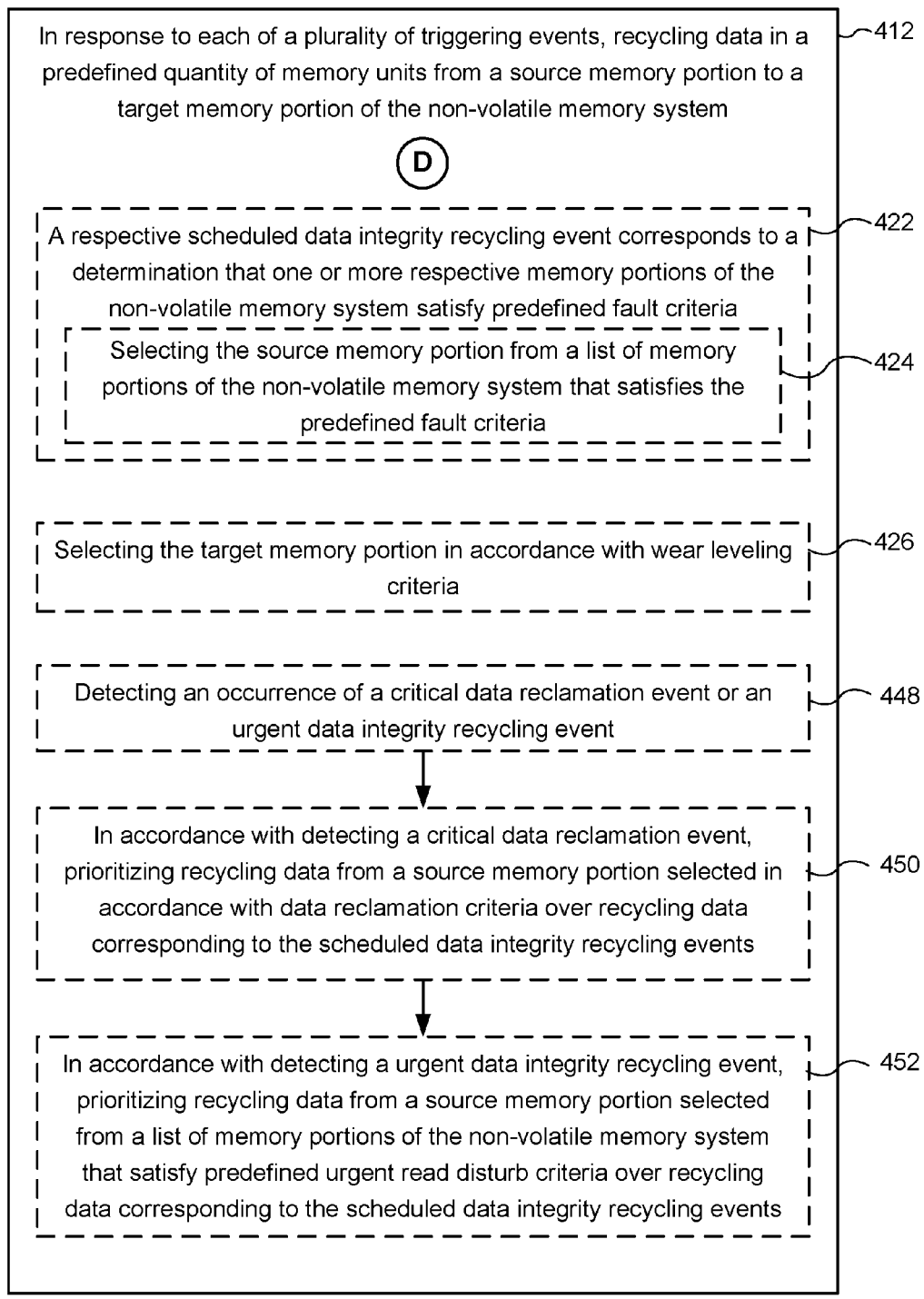

FIG. 3B illustrates a conceptual flowchart representation of a method 350 of determining a timeout period for data integrity garbage collection in a non-volatile memory system, in accordance with some embodiments. With reference to the non-volatile memory system 100 illustrated in FIG. 1, in some embodiments, method 350 is performed by a storage device (e.g., storage device 120, FIG. 1) or one or more components of the storage device (e.g., scheduler 220 and/or garbage collection control module 222 of storage device 120, FIG. 2). For ease of explanation, the following describes method 350 as performed by a storage device (e.g., by storage device 120, FIG. 1, or a component thereof such as garbage collection control module 222, FIG. 2). In some embodiments, method 350 is governed by instructions that are stored in a non-transitory computer readable storage medium and that are executed by one or more processors of a device, such as the one or more processing units (CPUs) 122-1 of management module 121-1 (FIG. 1).

In some embodiments, some of the operations (or alternatively, steps) of method 350 are performed at a host system (e.g., computer system 110) that is operatively coupled with the storage device, and other operations of method 350 are performed at the storage device. In some of these embodiments, method 350 is governed, at least in part, by instructions that are stored in a non-transitory computer readable storage medium and that are executed by one or more processors (e.g., hardware processors) of the host system (the one or more processors of the host system are not shown in FIG. 1).

Method 350 begins, in some embodiments, when the storage device (e.g., storage device 120, FIG. 1, or a component thereof such as garbage collection control module 222, FIG. 2) determines (352) whether there is an urgent data integrity event. In some embodiments, this is accomplished by checking whether urgent read disturb list 236 is empty. If urgent read disturb list 236 is not empty, there is an urgent data integrity event.

If the storage device determines there is an urgent data integrity event (352—Yes), the storage device sets (354) the timer to a minimum timeout period. In some embodiments, a timeout period associated with an urgent read disturb garbage collection is the smallest or minimum timeout value for the timer. In some embodiments, the minimum timeout value is set to be 500 μs. In some embodiments, assuming that X pages of data are written during each garbage collection operation (e.g., 8 pages per garbage collection operation, with 32 KB data per page), a maximum data recycling rate corresponding to the minimum timeout period is:

$$\frac{32 \text{ KB/page} \times 8 \text{ pages}}{500 \text{ } \mu s} = 512 \text{ MB/s}.$$

In some embodiments, the minimum timeout value can be used for other reasons. For example, in response to detecting that the memory device is left powered off for an extended period of time, e.g., longer than a predetermined threshold value, when the memory device is powered back on, the timeout period is set to the minimum timeout value to ensure that data integrity garbage collection, including data retention garbage collection, is performed at the maximum data recycling rate, while still enabling host write operations to be performed.

After setting the timer to the minimum timeout period, the storage device restarts (356) the timer and performs (358) a garbage collection operation, sometimes called an urgent data integrity event or urgent data integrity garbage collection operation. For example, the memory storage device selects one or more superblocks from urgent read disturb list 236 as one or more source superblocks, and performs an urgent read disturb garbage collection operation, copying data from the one or more source superblocks to one or more target superblocks.

If the storage device determines there is no urgent data integrity event to be scheduled (352—No), the storage device sets (360) the timer to a primary timeout period (also sometimes called the normal timeout period, or default timeout period). For example, the storage device may determine that urgent read disturb list 236 is empty. In some embodiments, the storage device determines a primary trigger timeout period in accordance with the projected quantity of data (e.g., in pages, blocks, and/or superblocks) for which data integrity recycling is to be performed by the non-volatile memory system over a period of time. In some embodiments, the period of time for which the determination is made is a minute, or an hour, or any other appropriate time period.

In some embodiments, when the storage device determines that there is data to be recycled from one or more expiring time pools (i.e., data retention garbage collection), operation 360 includes determining a data retention recycling rate ($Rate_r$) as a function of the quantity of data in the expiring time pools. For example:

$Rate_r = f$(a quantity of data in expiring time pool(s), time parameter for data retention recycle)

For example, the data retention recycling rate ($Rate_r$) can be determined by:

$$Rate_r = \frac{\text{number of superblocks for data retention recycle} \times \text{data per superblock}}{\text{time parameter for data retention recycling}}$$

In some embodiments, the number of superblocks for data retention recycle can be determined based on information from time pool list(s) 242. In some embodiments, the quantity of data in each superblock for data retention garbage collection is determined in accordance with a quantity of valid data in one or more expiring (e.g., oldest) time pools. In some other embodiments, each superblock for data retention garbage collection is assumed to be full with valid data when calculating the data retention recycling rate. The time parameter for data retention recycling may be a time period that extends until an oldest time pool reaches its expiration time. For example, the time parameter for data retention recycling may be 8 hours, a day, or a week.

In some embodiments in which data retention recycling is based on errors detected during read patrol operations, instead of time pools, a data retention recycling rate is determined based on (e.g., as a function of) the number of superblocks listed in one or more data retention lists, and a time parameter or data retention recycling.

In some embodiments, when the storage device determines that non-urgent read disturb list 238 is not empty, operation 360 includes determining a non-urgent read disturb recycling rate ($Rate_{nrd}$) as a function of the quantity of data in non-urgent read disturb list 238.

$Rate_{nrd} = f$(a quantity of data in non-urgent read disturb list, time parameter for non-urgent read disturb recycle)

For example, the non-urgent read disturb recycling rate ($Rate_{nrd}$) can be determined by:

$$Rate_{nrd} = \frac{\text{number of superblocks for non-urgent read disturb recycle} \times \text{data per superblock}}{\text{time parameter for non-urgent read disturb recycle}}$$

In some embodiments, the number of superblocks for non-urgent read disturb recycling can be determined based on non-urgent read disturb list 238. In some embodiments, the quantity of data for non-urgent read disturb recycling is determined in accordance with a quantity of valid data in the superblocks listed on non-urgent read disturb list 238. In some alternative embodiments, each superblock for non-urgent read disturb garbage collection is assumed to be full with valid data when calculating the non-urgent read disturb recycling rate. The time parameter for non-urgent read disturb recycling may be a predetermined time period. In yet other embodiments, when the storage device determines that non-urgent read disturb list 238 is not empty, operation 360 includes setting the a non-urgent read disturb recycling rate ($Rate_{nrd}$) to a predetermined non-urgent read disturb recycling rate, such as a rate corresponding to recycling a predetermined number of pages of data (e.g., 8 pages of data) every T1 or T2 seconds (see examples of values provided above).

In some embodiments, when the storage device determines fault list 240 is not empty, operation 360 includes determining a fault recycling rate ($Rate_f$) a function of the quantity of data in the fault list.

$Rate_f = f$(a quantity of data in fault list, time parameter for fault recycle)

For example, the fault recycling rate ($Rate_f$) can be determined by:

$$Rate_f = \frac{\text{number of superblocks for fault recycle} \times \text{data per superblock}}{\text{time parameter for fault recycle}}$$

In some embodiments, the number of superblocks for fault recycling can be determined based on fault list 240. In some embodiments, the quantity of data fault recycle is determined in accordance with a quantity of valid data in the superblocks listed on fault list 240. In some alternative embodiments, each superblock for fault garbage collection is assumed to be full with valid data when calculating the fault recycling rate. The time parameter may be a predetermined time period for fault recycling. In yet some other embodiments, when the storage device determines that fault 240 is not empty, operation 360 includes setting the fault recycling rate to a predetermined fault recycling rate, such as a rate corresponding to recycling one superblock every T3 (e.g., 10, 20 or 30) seconds.

In some embodiments, timeout periods for respective recycle events can be determined in accordance with the respective recycling rates determined at operation 360. For example, if a recycling rate is determined to be y pages/second and it is assumed that X pages of data are written (i.e., garbage collected) during each timeout period (e.g., 8 pages per timeout period), a corresponding timeout period (T seconds/period) can be determined to be $$T = \frac{X \text{ (pages/period)}}{y \text{ (pages/second)}} = \frac{X}{y} \text{ (seconds/period)}.$$

Thus, respective timeout periods for data retention garbage collection $T_r$, non-urgent read disturb garbage collection $T_{nrd}$, and fault garbage collection $T_f$ can be determined accordingly. In some embodiments, non-urgent read disturb garbage collection with different triggering criteria have different timeout periods. For example, the first level of non-urgent read disturb garbage collection with the intermediate-limit threshold may have a timeout period of 5 seconds. The second level of non-urgent read disturb garbage collection with the near-limit threshold may have a timeout period of 2 seconds.

Next, the storage device (e.g., storage device 120, FIG. 1, or a component thereof such as scheduler 220, FIG. 2) produces (362) a hybrid timeout period (also sometimes called a combined timeout period) in accordance with respective timeout periods determined according to operation 360. In some embodiments, the hybrid timeout period is produced by combining the two or more timeout periods determined at operation 360. In one example, the hybrid timeout period ($T_h$) is determined by:

$$T_h = \frac{1}{\frac{1}{T_r} + \frac{1}{T_{nrd}} + \frac{1}{T_f}}$$

In another example, the storage device may select the shortest timeout period as the hybrid timeout period $T_h$. Other schemes for determining the hybrid timeout period may be also used.

In some embodiments, the storage device (e.g., storage device 120, FIG. 1, or a component thereof such as scheduler 220, FIG. 2) adjusts (364) the hybrid timeout period (and the hybrid recycling rate) based on a recent garbage collection performance. In some embodiments, a projected quantity of pages to be recycled during a prior period of time may not be identical to the quantity of pages that were actually recycled during the prior period of time. This discrepancy may arise from the assumption that each superblock for recycling is full with valid data when calculating the recycling rate, because one or more superblocks may have less valid data than assumed. The discrepancy may also come from other causes, such as an unexpected increase or decrease in host write operations, which causes a corresponding increase or decrease in data reclamation garbage collection operations.

In some embodiments, operation 364 is performed periodically, e.g., once every 10 seconds. In some embodiments, the storage device calculates a projected quantity of memory units (e.g., pages) to be recycled within a prior predefined period, and also determines a quantity of memory units that have actually been recycled in the prior predefined period. The storage device then determines an adjustment factor based on a comparison between the projected quantity and the actually recycled quantity. The storage device then adjusts the timeout period and/or the hybrid timeout period in accordance with the adjustment factor.

In some embodiments, the adjustment factor is a ratio between the projected quantity of data recycling during a prior predefined period and the actually quantity of data recycled during the prior predefined period. For a next predefined period, the timeout period may be adjusted by multiplying the timeout period computed for the current period, for example the timeout period computed by operation 362, by the adjustment ratio. For example, during each 10-second interval, the storage device checks the garbage collection performance in the preceding 10-second interval. If the storage device determines that 10% more data recycling was done than projected, the storage device lengthens the timeout period by 10%. Conversely, if the storage device determines that 20% less data recycling was done than projected, the storage device shortens the timeout period by 20%.

The storage device sets (366) the timer to the hybrid timeout period (determined at operation 362) or the adjusted timeout period (determined at operation 364), restarts (368) the timer, and performs (370) a non-urgent data integrity event, as explained above with reference to operations 314-318 of FIG. 3A. Alternatively, in some embodiments, the timer is not set to the hybrid timeout period until the next time the timer expires (302, FIG. 3A).

Additional details concerning each of the processing steps for method 300 and method 350, as well as details concerning additional processing steps, are presented below with reference to FIGS. 4A-4E.

FIGS. 4A-4E illustrate a flowchart representation of a method 400 of performing garbage collection in a non-volatile memory system, in accordance with some embodiments. With reference to the non-volatile memory system 100 pictured in FIG. 1, in some embodiments, method 400 is performed by a storage device (e.g., storage device 120) or one or more components of the storage device (e.g., storage controller 124 or management module 121-1). In some embodiments, method 400 is governed by instructions that are stored in a non-transitory computer-readable storage medium (e.g., controller memory 206, FIG. 2) and that are executed by one or more processors of a device, such as the one or more processing units (CPUs) 122-1 of management module 121-1. In some embodiments, some of the operations of method 400 are performed at a host system (e.g., computer system 110) that is operatively coupled with the storage device, and other operations of method 400 are performed at the storage device. In some embodiments, method 400 is governed, at least in part, by instructions that are stored in a non-transitory computer-readable storage medium and that are executed by one or more processors of the host system (the one or more processors of the host system are not shown in FIG. 1).

With reference to FIG. 2, in some embodiments, the operations of method 400 are performed, at least in part, by a read module (e.g., read module 212, FIG. 2), a write module (e.g., write module 214, FIG. 2), an erase module (e.g., erase module 216, FIG. 2), and/or a garbage collection control module (e.g., garbage collection control module 222, FIG. 2). For ease of explanation, the following describes method 400 as performed by a storage device (e.g., by storage device 120, FIG. 1, or a component thereof such as garbage collection control module 218, FIG. 2).

With reference to FIGS. 4A-4E, the storage device determines (402) occurrences of triggering events. In some embodiments, the triggering events include data reclamation events, urgent data integrity recycling events, and scheduled data integrity recycling events as explained above with reference to FIG. 3A. In some embodiments, the data reclamation events include events that each corresponds to the occurrence of one or more host data write operations in accordance with a target reclamation to host write ratio. In some embodiments, the data reclamation events include critical data reclamation events and non-critical data reclamation events. In some embodiments, as described above with reference to FIG. 3B, a respective urgent data integrity recycling event occurs when a respective memory portion (e.g., a respective superblock) of the non-volatile memory system satisfies predefined urgent read disturb criteria. In some embodiments, the scheduled data integrity recycling events include events that occur at a rate corresponding to a projected quantity of memory units for which data integrity recycling is to be performed by the non-volatile memory system over a period of time.

In some embodiments, each of the urgent data integrity recycling events and the scheduled data integrity recycling events occurs (404) when a trigger timeout period expires, as explained above with reference to operation 302 of FIG. 3A. In some embodiments, the trigger timeout period is set (404) to distinct values in response to different predefined data integrity recycling conditions of the non-volatile memory system, as explained above with reference to operation 360 of FIG. 3B.

In some embodiments, in response to recycling data from a respective source memory portion (e.g., a respective source superblock) to a respective target memory portion (e.g., a respective target superblock) of the non-volatile memory system, the storage device (e.g., storage device 120, FIG. 1, or a component thereof such as scheduler 220, FIG. 2) resets (406) a timer to restart the trigger timeout period as explained above with reference to operation 312 of FIG. 3A and/or operation 368 of FIG. 3B.

In some embodiments, the trigger timeout period is set (408) to a predefined minimum timeout value in response to detecting that a memory portion satisfies the predefined urgent read disturb criteria, as explained above with reference to operation 356 of FIG. 3B.

In some embodiments, at predefined times, the storage device determines (410) a primary trigger timeout period in accordance with the projected quantity of memory units (e.g., pages) or memory portions (e.g., superblocks) for which data integrity recycling is to be performed by the non-volatile memory system over the period of time, as explained above with reference to operation 360 of FIG. 3B.

In response to each of a plurality of triggering events, the storage device (e.g., storage device 120, FIG. 1, or a component thereof such as garbage collection control module 222, FIG. 2) recycles (412) data in a predefined quantity of memory units from a source memory portion to a target memory portion of the non-volatile memory system, as explained above with reference to operation 318 of FIG. 3A.

In some embodiments, the storage device provides (414) one or more collections of memory portions (e.g., time pools) each including one or more memory portions based on time attributes (or, alternatively, error rate attributes observed during patrol reads) associated with the respective memory portions, as explained above with reference to FIG. 3A. In some embodiments, the one or more collections of memory portions are ordered based on the time attributes of the respective memory portions included in the respective collections of memory portions.

In some embodiments, at a predefined time period, the storage device selects (416) the source memory portion from respective memory portions of a first set of collections of memory portions for data integrity recycling (e.g., data retention garbage collection), as explained above with reference to operation 314 of FIG. 3A. In some embodiments, the first set of collections is determined based on expiration times of the respective collections. In some embodiments, the storage device further determines the projected quantity of memory units (e.g., a projected quantity of pages) for data integrity recycling in accordance with a quantity of valid data in a first set of collections of memory portions of the one or more collections of memory portions.

In some embodiments, a respective scheduled data integrity recycling event corresponds (418) to a determination that one or more respective memory portions (e.g., superblocks) of the non-volatile memory system satisfies predefined non-urgent read disturb criteria. In some embodiments, the non-urgent read disturb criteria comprises one or more distinct criteria for initiating different levels of non-urgent read disturb garbage collection, as explained with reference to FIG. 3A.

In some embodiments, the storage device selects (420) the source memory portion (e.g., a source superblock) from a list of memory portions of the non-volatile memory system that satisfies the predefined non-urgent read disturb criteria (e.g., from non-urgent read disturb list 238), as explained above with reference to operation 314 of FIG. 3A.

In some embodiments, a respective scheduled data integrity recycling event corresponds (422) to a determination that one or more respective memory portions (e.g., superblocks) of the non-volatile memory system satisfy predefined fault criteria. In some embodiments, the storage device selects (424) the source memory portion (e.g., a source superblock) from a list of memory portions of the non-volatile memory system that satisfies the predefined fault criteria (e.g., superblocks listed in fault list 240), as explained above with reference to operation 314 of FIG. 3A.

In some embodiments, the storage device selects (426) the target memory portion in accordance with wear leveling criteria, as explained above with reference to operation 316 of FIG. 3A.

In some embodiments, in response to determining (428) occurrences of a first type of non-urgent recycling events and a second type of the non-urgent recycling events, the storage device calculates (430) a first timeout period for the first type of the non-urgent recycling event, and a second timeout period for the second type of the non-urgent recycling event, as explained above with reference to operation 360 of FIG. 3B. In some embodiments, a determination of occurrence of a non-urgent recycling event corresponds (428) to a respective scheduled data integrity recycling event (e.g., a garbage collection operation to be performed in the future). The storage device calculates (432) a hybrid timeout period in accordance with the first timeout period and the second timeout period, as explained above with reference to operation 362 of FIG. 3B.

The storage device selects (434) a source memory portion (e.g., a superblock) based on a predetermined priority between the first type of the non-urgent recycling event and the second type of the non-urgent recycling event, as explained above with reference to operation 314 of FIG. 3A. Further, the storage device recycles (436) data from the source memory portion to the target memory portion of the non-volatile memory system in accordance with the calculated hybrid timeout period, as explained above with reference to operation 370 of FIG. 3B and operation 318 of FIG. 3A.

In some embodiments, the storage device stores (438) one or more attributes for each memory portion (e.g., each superblock). In some embodiments, the one or more attributes are selected from the set consisting of: a time attribute, one or more read disturb counts or status values, a fault attribute, a number of memory units having valid data, a number of memory units having invalid data, and a wear leveling attribute, as explained above with reference to FIG. 2.

In some embodiments, the storage device (e.g., storage device 120, FIG. 1, or a component thereof such as garbage collection control module 222, FIG. 2) calculates (440) a first quantity, corresponding to a projected quantity of memory units to be recycled within a prior predefined period, determines (442) a second quantity, corresponding to a quantity of memory units recycled in the prior predefined period, determines (444) an adjustment factor based on the first quantity and second quantity, and adjusts (446) the trigger timeout period value in accordance with the adjustment factor, as explained above with reference to operation 364 of FIG. 3B.

In some embodiments, the storage device detects (448) an occurrence of a critical data reclamation event or an urgent data integrity recycling event. In some embodiments, in accordance with detecting a critical data reclamation event, the storage device prioritizes (450) recycling data from a source memory portion selected in accordance with data reclamation criteria over recycling data corresponding to the scheduled data integrity recycling events. In some embodiments, in accordance with detecting a urgent data integrity recycling event, the storage device prioritizes (452) recycling data from a source memory portion selected from a list of memory portions of the non-volatile memory system that satisfy predefined urgent read disturb criteria over recycling data corresponding to the scheduled data integrity recycling events.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the "second contact" are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of recycling data in a non-volatile memory system, comprising:
   determining occurrences of triggering events, wherein the triggering events include:
   data reclamation events, urgent data integrity recycling events, and scheduled data integrity recycling events, wherein the data reclamation events include events that each corresponds to the occurrence of one or more host data write operations in accordance with a target reclamation to host write ratio, a respective urgent data integrity recycling event occurs when a respective memory portion of the non-volatile memory system satisfies predefined urgent read disturb criteria, and the scheduled data integrity recycling events include events that occur at a rate corresponding to a projected quantity of memory units for which data integrity recycling is to be performed by the non-volatile memory system over a period of time;
   in response to each of a plurality of triggering events, recycling data in a predefined quantity of memory units from a source memory portion to a target memory portion of the non-volatile memory system; and
   in response to determining occurrences of a first type of non-urgent recycling events and a second type of the non-urgent recycling events, calculating a hybrid timeout period in accordance with a first timeout period and a second timeout period.

2. The method of claim 1, wherein each of the urgent data integrity recycling events and the scheduled data integrity recycling events occurs when a trigger timeout period expires, and wherein the trigger timeout period is set to distinct values in response to different predefined data integrity recycling conditions of the non-volatile memory system.

3. The method of claim 2, further comprising: resetting a timer to restart the trigger timeout period, in response to recycling data from a respective source memory portion to a respective target memory portion of the non-volatile memory system.

4. The method of claim 1, wherein the trigger timeout period is set to a predefined minimum timeout value in response to detecting that a memory portion satisfies the predefined urgent read disturb criteria.

5. The method of claim 1, further comprising, at predefined times, determining a primary trigger timeout period in accordance with the projected quantity of memory units for which data integrity recycling is to be performed by the non-volatile memory system over the period of time.

6. The method of claim 1, further comprising:
providing one or more collections of memory portions each including one or more memory portions based on time attributes associated with the respective memory portions, wherein the one or more collections of memory portions are ordered based on the time attributes of the respective memory portions included in the respective collections of memory portions; and
at a predefined time period, selecting the source memory portion from respective memory portions of a first set of collections of memory portions for data integrity recycling, wherein the first set of collections is determined based on expiration times of the respective collections.

7. The method of claim 1, wherein a respective scheduled data integrity recycling event corresponds to a determination that one or more respective memory portions of the non-volatile memory system satisfies predefined non-urgent read disturb criteria.

8. The method of claim 7, further comprising selecting the source memory portion from a list of memory portions of the non-volatile memory system that satisfies the predefined non-urgent read disturb criteria.

9. The method of claim 1, wherein a respective scheduled data integrity recycling event corresponds to a determination that one or more respective memory portions of the non-volatile memory system satisfy predefined fault criteria.

10. The method of claim 9, further comprising selecting the source memory portion from a list of memory portions of the non-volatile memory system that satisfies the predefined fault criteria.

11. The method of claim 1, further comprising,
selecting a source memory portion based on a predetermined priority between the first type of the non-urgent recycling event and the second type of the non-urgent recycling event; and
recycling data from the source memory portion to the target memory portion of the non-volatile memory system in accordance with the calculated hybrid timeout period,
wherein a determination of occurrences of a non-urgent recycling even corresponds to a respective scheduled data integrity recycling event.

12. The method of claim 1, further comprising selecting the target memory portion in accordance with wear leveling criteria.

13. The method of claim 1, further comprising: storing, for each memory portion, one or more attributes selected from the set consisting of: a time attribute, one or more read disturb counts or status values, a fault attribute, a number of memory units having valid data, a number of memory units having invalid data, and a wear leveling attribute.

14. The method of claim 1, further comprising:
calculating a first quantity, corresponding to a projected quantity of memory units to be recycled within a prior predefined period;
determining a second quantity, corresponding to a quantity of memory units recycled in the prior predefined period;
determining an adjustment factor based on the first quantity and second quantity;
adjusting the trigger timeout period value in accordance with the adjustment factor.

15. The method of claim 1, further comprising:
detecting an occurrence of a critical data reclamation event or an urgent data integrity recycling event;
in accordance with detecting a critical data reclamation event, prioritizing recycling data from a source memory portion selected in accordance with data reclamation criteria over recycling data corresponding to the scheduled data integrity recycling events; and
in accordance with detecting a urgent data integrity recycling event, prioritizing recycling data from a source memory portion selected from a list of memory portions of the non-volatile memory system that satisfy predefined urgent read disturb criteria over recycling data corresponding to the scheduled data integrity recycling events.

16. A non-volatile memory system, comprising:
non-volatile memory;
one or more processors; and
memory storing one or more programs that, when executed by the one or more processors, cause the non-volatile memory system to perform operations comprising:
determining occurrences of triggering events, wherein the triggering events include: data reclamation events, urgent data integrity recycling events, and scheduled data integrity recycling events, wherein the data reclamation events include events that each corresponds to the occurrence of one or more host data write operations in accordance with a target reclamation to host write ratio, a respective urgent data integrity recycling event occurs when a respective memory portion of the non-volatile memory system satisfies predefined urgent read disturb criteria, and the scheduled data integrity recycling events include events that occur at a rate corresponding to a projected quantity of memory units for which data integrity recycling is to be performed by the non-volatile memory system over a period of time;
in response to each of a plurality of triggering events, recycling data in a predefined quantity of memory units from a source memory portion to a target memory portion of the non-volatile memory system; and
in response to determining occurrences of a first type of non-urgent recycling events and a second type of the non-urgent recycling events, calculating a hybrid timeout period in accordance with a first timeout period corresponding to the first type of non-urgent recycling events and a second timeout period corresponding to the second type of non-urgent recycling events.

17. The non-volatile memory system of claim 16, wherein each of the urgent data integrity recycling events and the scheduled data integrity recycling events occurs when a trigger timeout period expires, and wherein the trigger timeout period is set to distinct values in response to different predefined data integrity recycling conditions of the non-volatile memory system.

18. The non-volatile memory system of claim 16, wherein the one or more programs further include instructions that, when executed by the one or more processors, cause the nonvolatile memory system to further perform operations comprising: resetting a timer to restart the trigger timeout period, in response to recycling data from a respective source memory portion to a respective target memory portion of the non-volatile memory system.

19. The non-volatile memory system of claim 16, wherein the trigger timeout period is set to a predefined minimum timeout value in response to detecting that a memory portion satisfies the predefined urgent read disturb criteria.

20. A non-transitory computer readable storage medium, storing one or more programs configured for execution by one or more processors of a non-volatile memory system, the one or more programs including instructions that when executed by the one or more processors cause the non-volatile memory system to perform operations comprising:
   determining occurrences of triggering events, wherein the triggering events include: data reclamation events, urgent data integrity recycling events, and scheduled data integrity recycling events, wherein the data reclamation events include events that each corresponds to the occurrence of one or more host data write operations in accordance with a target reclamation to host write ratio, a respective urgent data integrity recycling event occurs when a respective memory portion of the non-volatile memory system satisfies predefined urgent read disturb criteria, and the scheduled data integrity recycling events include events that occur at a rate corresponding to a projected quantity of memory units for which data integrity recycling is to be performed by the non-volatile memory system over a period of time;
   in response to each of a plurality of triggering events, recycling data in a predefined quantity of memory units from a source memory portion to a target memory portion of the non-volatile memory system; and
   in response to determining occurrences of a first type of non-urgent recycling events and a second type of the non-urgent recycling events:
      calculating a first timeout period for the first type of the non-urgent recycling events and a second timeout period for the second type of the non-urgent recycling events; and
      calculating a hybrid timeout period in accordance with the first timeout period and the second timeout period.

* * * * *